US010814323B2

(12) United States Patent
Ingber et al.

(10) Patent No.: US 10,814,323 B2
(45) Date of Patent: Oct. 27, 2020

(54) MICROFLUIDIC CARTRIDGE ASSEMBLY

(71) Applicant: President and Fellows of Harvard College, Cambridge, MA (US)

(72) Inventors: Donald E. Ingber, Boston, MA (US); Daniel Levner, Cambridge, MA (US); Guy Thompson, II, Lexington, MA (US); Christopher David Hinojosa, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 67 days.

(21) Appl. No.: 16/379,443

(22) Filed: Apr. 9, 2019

(65) Prior Publication Data

US 2019/0247854 A1 Aug. 15, 2019

Related U.S. Application Data

(60) Continuation of application No. 15/844,562, filed on Dec. 17, 2017, now Pat. No. 10,293,339, which is a
(Continued)

(51) Int. Cl.
*A61J 1/06* (2006.01)
*B01L 3/00* (2006.01)
(Continued)

(52) U.S. Cl.
CPC ... *B01L 3/502715* (2013.01); *B01L 3/502707* (2013.01); *B01L 3/56* (2013.01);
(Continued)

(58) Field of Classification Search
CPC .... B23P 17/04; B29C 47/00; B01L 3/502715; B01L 3/502707; B01L 3/56;
(Continued)

(56) References Cited

U.S. PATENT DOCUMENTS 10,004,434 B1 * 6/2018 Paranjape .......... A61B 5/14514
2006/0194331 A1 * 8/2006 Pamula ............... B81C 1/00119 436/150

(Continued)

FOREIGN PATENT DOCUMENTS

GB 2529293 2/2016
WO WO 2002/059625 8/2002

(Continued)

OTHER PUBLICATIONS

International Search Report, PCT/US2014/047694, dated Jan. 2, 2015 (4 pages).

(Continued)

*Primary Examiner* — Brian J. Sines
(74) *Attorney, Agent, or Firm* — Nixon Peabody LLP

(57) ABSTRACT

According to aspects of the present invention, a cartridge assembly for transporting fluid into or out of one or more fluidic devices includes a first layer and a second layer. The first layer includes a first surface. The first surface includes at least one partial channel disposed thereon. The second layer abuts the first surface, thereby forming a channel from the at least one partial channel. At least one of the first layer and the second layer is a resilient layer formed from a pliable material. At least one of the first layer and the second layer includes a via hole. The via hole is aligned with the channel to pass fluid thereto. The via hole is configured to pass fluid through the first layer or the second layer substantially perpendicularly to the channel. Embossments are also used to define aspects of a fluidic channel.

24 Claims, 18 Drawing Sheets

Related U.S. Application Data division of application No. 14/906,335, filed as application No. PCT/US2014/047694 on Jul. 22, 2014, now Pat. No. 9,855,554.

(60) Provisional application No. 61/856,876, filed on Jul. 22, 2013.

(51) Int. Cl.
*G01N 21/00* (2006.01)
*G01N 27/00* (2006.01)

(52) U.S. Cl.
CPC . *B01L 2200/027* (2013.01); *B01L 2200/0684* (2013.01); *B01L 2200/0689* (2013.01); *B01L 2200/12* (2013.01); *B01L 2300/0645* (2013.01); *B01L 2300/0816* (2013.01); *B01L 2300/0874* (2013.01); *B01L 2300/0887* (2013.01); *B01L 2300/123* (2013.01); *B01L 2400/0481* (2013.01); *B01L 2400/0655* (2013.01)

(58) Field of Classification Search
CPC ........... B01L 2200/027; B01L 2200/12; B01L 2200/0689; B01L 3/00; B01L 2300/0645; B01L 2300/0816; B01L 2300/0874; B01L 2300/0887; B01L 2300/123; B01L 2400/0481; B01L 2400/0655; A61J 1/06; G01N 21/00; G01N 27/00
See application file for complete search history.

(56) References Cited

U.S. PATENT DOCUMENTS

| | | | | |
|---|---|---|---|---|
| 2008/0166727 | A1* | 7/2008 | Esfandyarpour | C12Q 1/6869 435/6.11 |
| 2008/0200343 | A1* | 8/2008 | Clemens | G01N 27/27 506/9 |
| 2013/0156644 | A1 | 6/2013 | Lee | |
| 2014/0038279 | A1 | 2/2014 | Ingber | |
| 2014/0077315 | A1* | 3/2014 | Bischopink | G01N 33/5438 257/414 |
| 2014/0158233 | A1 | 6/2014 | Leslie | |
| 2014/0186414 | A1 | 7/2014 | Ingber | |
| 2014/0199764 | A1 | 7/2014 | Domansky | |
| 2014/0220617 | A1 | 8/2014 | Yung | |
| 2014/0287966 | A1 | 9/2014 | Gray | |
| 2014/0342445 | A1 | 11/2014 | Ingber | |
| 2015/0004077 | A1 | 1/2015 | Wikswo | |
| 2015/0079670 | A1 | 3/2015 | Domansky | |
| 2015/0137015 | A1 | 5/2015 | Toh | |
| 2015/0209783 | A1 | 7/2015 | Ingber | |
| 2015/0306596 | A1 | 10/2015 | Thompson | |
| 2015/0328635 | A1 | 11/2015 | Reiter | |
| 2015/0361489 | A1* | 12/2015 | Soper | B01L 3/502761 506/4 |
| 2016/0136646 | A1 | 5/2016 | Ingber | |
| 2016/0145555 | A1 | 5/2016 | Ingber | |
| 2017/0101628 | A1 | 4/2017 | Ingber | |

FOREIGN PATENT DOCUMENTS

| | | |
|---|---|---|
| WO | WO 2007/082480 | 7/2007 |
| WO | WO 2008/121691 | 10/2008 |
| WO | WO 2010/009307 | 1/2010 |
| WO | WO 2010/123594 | 10/2010 |
| WO | WO 2012/048261 | 4/2012 |
| WO | WO 2012/118799 | 9/2012 |
| WO | WO 2012/135834 | 10/2012 |
| WO | WO 2012/154834 | 11/2012 |
| WO | WO 2012/166903 | 12/2012 |
| WO | WO 2013/086486 | 6/2013 |
| WO | WO 2013/086502 | 6/2013 |
| WO | WO 2013/086512 | 6/2013 |
| WO | WO 2014/039514 | 3/2014 |
| WO | WO 2014/133624 | 9/2014 |
| WO | WO 2014/210364 | 12/2014 |
| WO | WO 2015/006751 | 1/2015 |
| WO | WO 2015/013332 | 1/2015 |
| WO | WO 2015/138032 | 9/2015 |
| WO | WO 2015/138034 | 9/2015 |

OTHER PUBLICATIONS

Written Opinion, PCT/US2014/047694, dated Jan. 2, 2015 (7 pages).
Extended European Search Report for Application No. EP 14 82 9645, dated Feb. 8, 2017 (7 pages).

* cited by examiner

MICROFLUIDIC CARTRIDGE ASSEMBLY

CROSS-REFERENCE TO RELATED APPLICATIONS

This application is a Continuation Application of U.S. patent application Ser. No. 15/844,562, filed Dec. 17, 2017, which is a Divisional Application of U.S. patent application Ser. No. 14/906,335, filed Jan. 20, 2016 which is a U.S. National Stage of International Application No. PCT/US2014/047694, filed Jul. 22, 2014 which claims the benefit of U.S. Provisional Patent Application No. 61/856,876, filed Jul. 22, 2013, which are incorporated herein by reference in their entireties.

GOVERNMENT SUPPORT

This invention was made with government support under grant no. W911NF-12-2-0036 awarded by U.S. Department of Defense, Defense Advanced Research Projects Agency. The government has certain rights in the invention.

TECHNICAL FIELD

The present invention is directed to methods and systems for interconnecting fluidic devices. More specifically, the present invention is directed to a cartridge assembly that facilitates interconnection with microfluidic devices.

BACKGROUND

According to existing approaches, fluidic (microfluidic and/or non-microfluidic) devices are typically interconnected using tubing and valves that connect the output of one device to the input of another. However, the use of tubing and valves presents some disadvantages.

In existing systems, a significant length of tubing is needed to connect two devices, and as such, the tubing may end up with a large quantity of dead volume that cannot be used by the devices. At most, this type of interconnection is effective only where small volumes of fluid need to be transferred between devices. Disadvantageously, the tubing must typically be primed with fluid in a complex and time-consuming set of operations that wastes fluid. Furthermore, after a procedure is completed (e.g., between experiments), the connective tubing must be flushed in another complex set of operations. Alternatively, a large quantity of tubing must be wastefully discarded and replaced before a subsequent procedure can be conducted.

While connecting a small number of devices may be possible with existing systems, it becomes increasingly difficult and complex to connect greater numbers of devices. This is especially the case when the interconnection system must use valves to allow the interconnection system to be configured or modified. More devices require more tubing and valves adding to the complexity and the expense of the system. For example, commercial low-volume selector valves used in such systems are very expensive. In addition, future undefined experiments may require new valve designs and tubing architectures. In general, existing approaches do not scale well for interconnection systems that require multiple replicates that need to be similarly interconnected.

SUMMARY

According to aspects of the present invention, a cartridge assembly for transporting fluid into or out of one or more fluidic devices includes a first layer and a second layer. The first layer includes a first surface. The first surface includes at least one partial channel disposed thereon. The second layer abuts the first surface, thereby forming a channel from the at least one partial channel. At least one of the first layer and the second layer is a resilient layer formed from a pliable material. At least one of the first layer and the second layer includes a via hole. The via hole is aligned with the channel to pass fluid thereto. The via hole is configured to pass fluid through the first layer or the second layer substantially perpendicularly to the channel.

According to further aspects of the present invention, a method of manufacturing a cartridge assembly to transport fluid into or out of one or more fluidic devices includes providing a first layer, providing a second layer, forming a via hole in at least one of the first layer and the second layer, abutting the second layer with a first surface to form a channel from at least one partial channel, and coupling the second layer to the first layer. The first layer includes the first surface. The first surface includes the at least one partial channel disposed thereon. The via hole is configured to pass fluid through the at least one of the first layer and the second layer. At least one of the first layer and the second layer is a resilient layer formed from a pliable material. The via hole is substantially perpendicular to the channel.

According to yet further aspects of the present invention, a fluidic device includes a first structure and a second structure. The first structure includes a surface and an embossment. The embossment is disposed on the surface of the first structure. The second structure is coupled to the first structure such that the embossment abuts the second structure. The abutment thereby forms a seal between the embossment and the second structure. The embossment, when abutting the second structure, defines an aspect of a fluidic channel disposed between the first structure and the second structure. At least one of the embossment and the second structure include a resilient material.

According to still yet further aspects of the present invention, a method of manufacturing a cartridge assembly to transport fluid into or out of one or more fluidic devices includes providing a first layer, providing a second layer, forming a via hole in at least one of the first layer and the second layer abutting the second layer with the first surface to form a channel from at least one partial channel, coupling the second layer to the first layer. The first layer includes a first surface. The first surface includes the at least one partial channel disposed thereon. The via hole is configured to pass fluid through the at least one of the first layer and the second layer. At least one of the first layer and the second layer is a resilient layer formed from a pliable material. The via hole is substantially perpendicular to the channel.

These and other capabilities of the invention, along with the invention itself, will be more fully understood after a review of the following figures, detailed description, and claims.

Figure 1A:
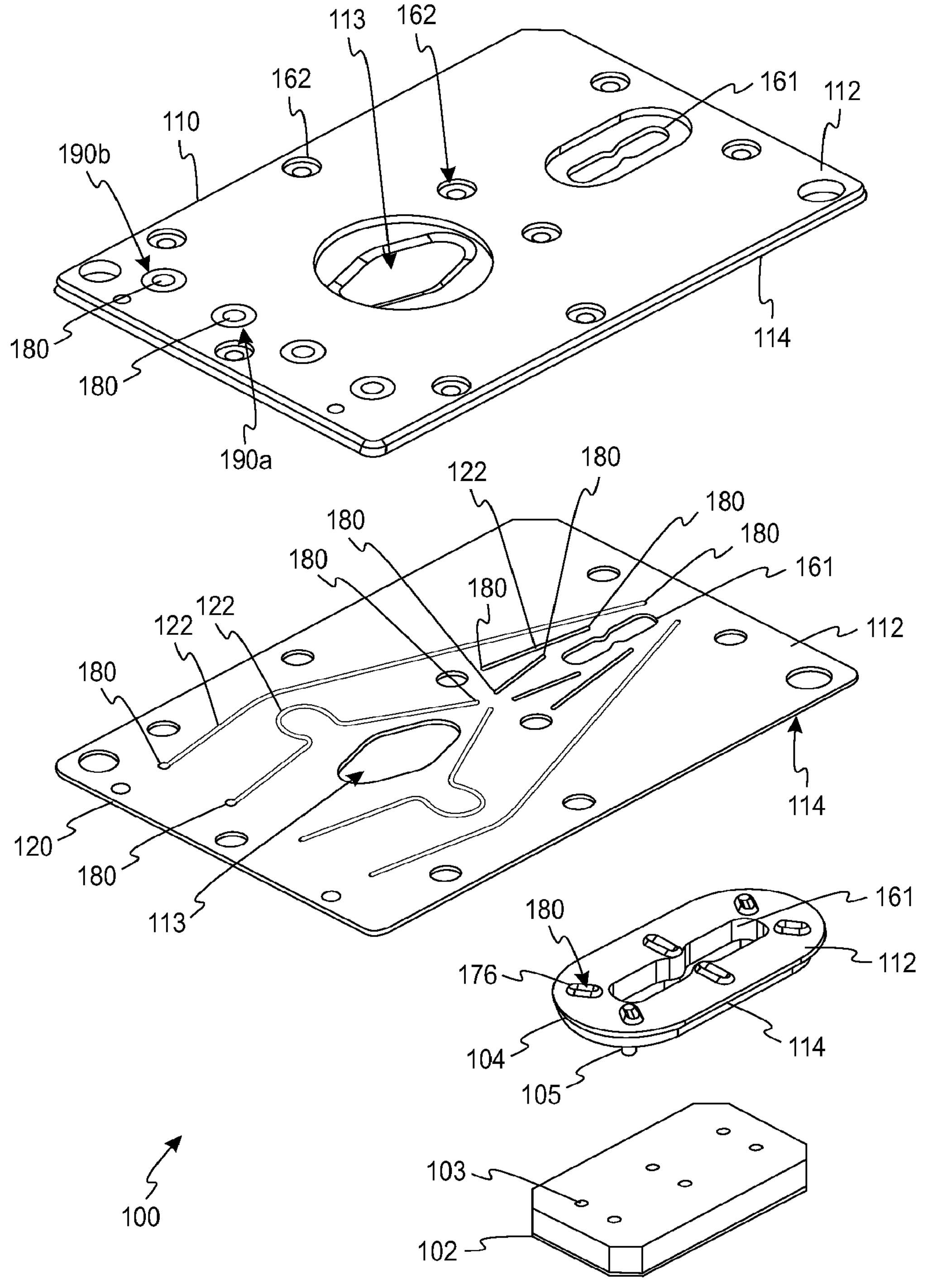
FIG. 1A shows an exploded, diagrammatic view of a cartridge assembly.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

According to aspects of the present invention, cartridge assemblies are employed to facilitate interconnection between microfluidic devices and other aspects of a fluidic system. In particular, the cartridge assemblies provide a standardized interface for interconnection. Beneficially, the cartridge assemblies provide modularity, lower-cost construction, and easy assembly for end-users.

According to further aspects of the present invention, a cartridge assembly is a layered assembly. Such cartridge assemblies are formed by assembling two or more layers which include structures that help define fluidic channels in the cartridge assembly. These fluidic channels can be employed to connect fluidic devices to fluidic systems and/or other fluidic devices. Additionally, in some embodiments, individual layers are fluidically linked by one or more via holes. Each via hole may traverse one or more layers to carry fluid through the traversed layers.

According to yet further aspects of the present invention, gasketing embossments are used to form fluidic interconnections and/or to create channels for guiding fluid flow. In particular, as will be described in further detail below, gasketing embossments are features that project from a surface and, when pressed against another surface, form liquid- or air-tight seals with the other surface. Beneficially, gasketing embossments provide for low-cost manufacturing of fluidic components (e.g., by removing or alleviating a need for bonding), greater tolerances for alignment of the components, and/or contact of the guided fluid with only selected portions of the other surface.

Figure 1B:
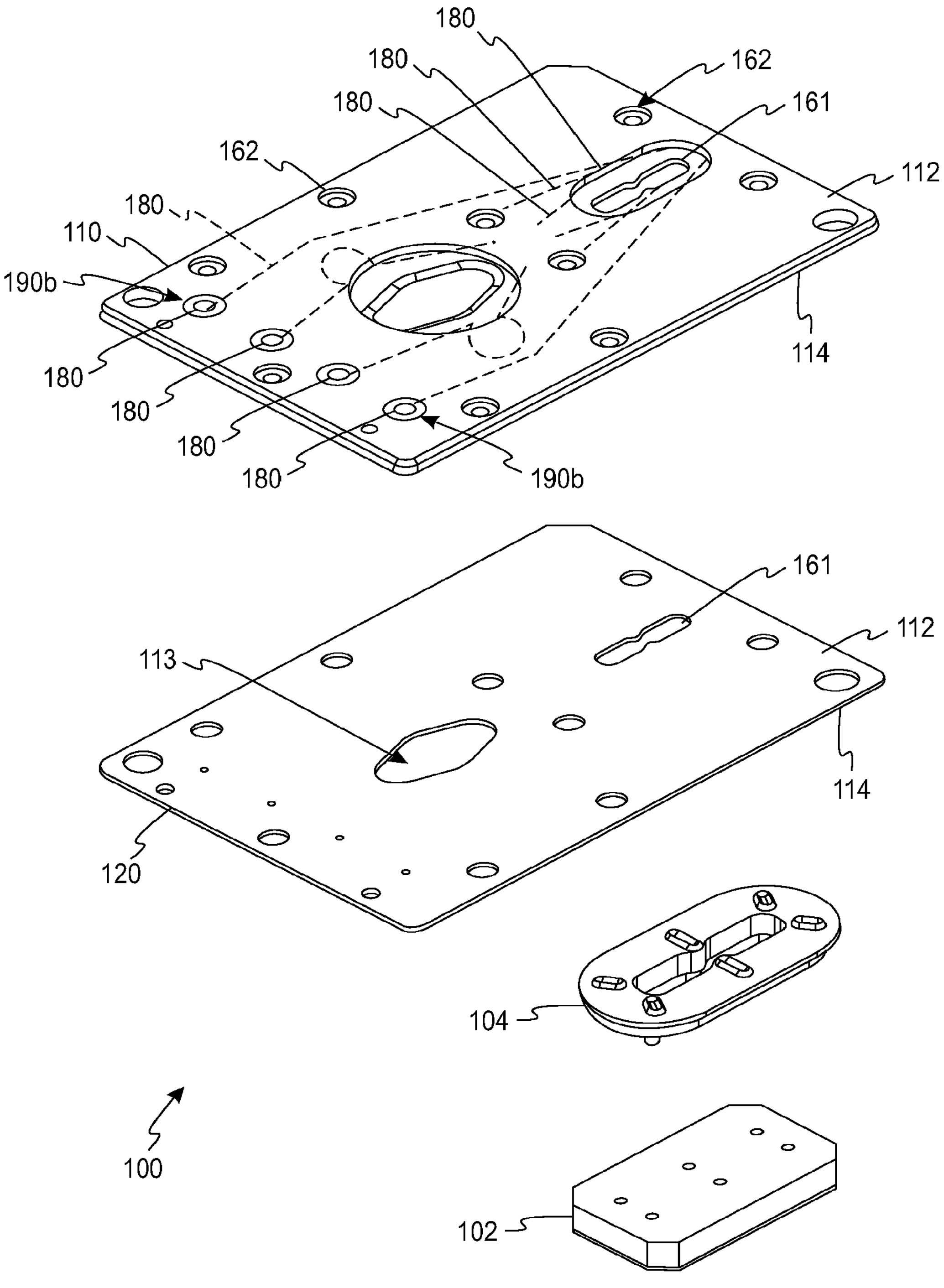
FIG. 1B shows an exploded, diagrammatic view of a cartridge assembly.

According to embodiments of the present invention, a cartridge assembly includes two or more layers that are assembled to form channels for microfluidic flow. Referring now to FIGS. 1A and 1B, an exploded view of a cartridge assembly including two layers is shown. FIG. 1A shows an exploded view of a cartridge assembly 100 having a support layer 110 and a resilient layer 120. The support layer 110 is a generally rigid layer that provides structural integrity to the cartridge assembly 100. The resilient layer 120 is a generally pliable layer that can be fabricated from a broad range of resilient materials such as elastomeric materials. The resilient layer 120, or portions thereof, can provide sufficient flexibility and/or deformation to establish a gas-tight or liquid-tight seal within the cartridge assembly. As shown, the resilient layer 120 includes a plurality of partial channels 122 and a plurality of via holes 180. The partial channels 122 are disposed on a first surface 112 of the resilient layer 120. The partial channels 122 have an open-faced structure, such as a partial rectangle or partial circle. In the illustrated embodiment, the via holes 180 are disposed at the terminal ends of each partial channel 122. As will be described in more detail below with respect to, for example, FIGS. 11A-11B, the plurality of via holes 180 may extend partially or completely through the resilient layer 120.

The support layer 110 includes a first surface 112 opposite a second surface 114. The support layer 110 also includes a plurality of inlet ports 190*a* and outlet ports 190*b* having via holes 180 passing from the first surface 112 to the second surface 114 of the support layer 110. The inlet ports 190*a* are configured to be coupled to system components such as fluid reservoirs such that fluid can be introduced to the microfluidic device 102 through the cartridge assembly 100. The outlet ports 190*b* are configured to be coupled to system components such that fluid that has traversed the microfluidic device 102 can be analyzed, fed to other system components, disposed of, etc.

When the cartridge assembly 100 is assembled, the resilient layer 120 conforms to the second surface 114 of the support layer 110 such that contact between the resilient layer 120 and support layer 110 form a gas-tight or liquid-tight seal adjacent the partial channels 122 (e.g., the open rectangular or circular shape becomes closed), thereby forming channels 122' within the cartridge assembly. The support layer 110 can be removably or permanently attached to the resilient layer 120. For example, the support layer 110 and resilient layer 120 can be removably attached using fasteners, clamps, clips, combinations thereof, and the like. For example, the support layer 110 and resilient layer 120 can be permanently attached using adhesives, welding, sonic welding, combinations thereof, and the like.

The cartridge assembly 100 is configured to be coupled to one or more microfluidic devices 102 using, for example, an interconnect adapter 104, which generally includes a plurality of nozzles 105 configured to interface with one or more microfluidic devices 102. The interconnect adapter 104 establishes a fluidic connection between the cartridge assembly 100 and the microfluidic device. The interconnect adapter 104 includes a first surface 112 opposite a second surface 114 and via holes 180 extending from the first surface 112 to the second surface 114. The first surface 112 of the interconnect adapter 104 can include one or more features configured to engage the cartridge assembly 100, such as gasketing embossments 176 (described in more detail below with reference to FIG. 13A-14). The second surface 114 includes one or more features such as nozzles 105 configured to removably engage the microfluidic device 102.

The interconnect adapter 104 can be either removably or permanently attached to the cartridge assembly 100. The interconnect adapter 104 can be removably attached using, for example, a plurality of nozzles, a trapping feature, fasteners, claims, clips, combinations thereof, and the like. The plurality of nozzles can be configured to engage a respective plurality of ports in the cartridge assembly 100 in a "snap-on, snap-off" or a "plug-and-play" configuration. The trapping feature can be any feature to trap or capture the interconnect adapter 104 such as the flange-shoulder mechanism described below with respect to FIG. 2A. The interconnect adapter 104 can be permanently attached to the cartridge assembly 100, for example, by being integrally formed a support layer 110 or a resilient layer 120 of the cartridge assembly 100, or by using adhesives, welding, sonic welding, combinations thereof, and the like.

The microfluidic device 102 includes a plurality of ports 103 configured to receive the nozzles 105 of the interconnect adapter 104. The engagement of the nozzles 105 with the ports 103 forms a gas-tight or liquid-tight seal therebetween. In some embodiments, the engagement of the nozzles 105 with the ports 103 entirely supports the microfluidic device during use, leading to a "snap-on, snap-off" or a "plug-and-play" configuration.

When the cartridge assembly 100 is assembled, the cartridge assembly 100, interconnect adapter 104, and microfluidic device 102 form one or more fluid circuits. A working fluid is introduced from the system to inlet 190*a* in the support layer 110. The working fluid then flows to the resilient layer 120 through via hole 180. The fluid is guided through one or more channels 122' formed by the partial channels until it reaches a via hole 180 through the resilient layer 120. The fluid is then passed to the microfluidic device 102 through a via hole 180 of the interconnect adapter 104. After exiting the microfluidic device 102, the fluid is passed through another via hole 180 of the interconnect adapter 104, flows through another one or more channels 122' until it reaches a via hole 180 through the support layer 110, and is output to the system through output port 190*b*.

The support layer 110 and resilient layer 120 can further include a number of non-fluidic, functional features such as an observation window 161, fastener-mounts 162, and a cartridge-assembly support mechanism 113. The observation window 161 allows the contents of the microfluidic device 102 to be observed, such as by using a microscope. The fastener-mounts 162 include one or more aligned elements such that fasteners (e.g., nuts and bolts, metal screws, rivets, etc.) or clips can be used to compress the layers of the cartridge assembly 100 together. In some embodiments, the fasteners or clips are integrated or formed into one or more of the layers of the cartridge assembly.

The cartridge-assembly support mechanism 113 is configured to interface with the system such that the cartridge assembly 100 can be mounted and suspended from the system. The cartridge-assembly support mechanism 113 can include a hole having a predefined shape that is configured to receive a retaining element mounted to a cartridge-assembly holder or base. When the cartridge-assembly retention mechanism extends through the hole, the cartridge assembly 100 can be locked in place by rotating the cartridge-assembly retention mechanism. Examples of cartridge-assembly retention mechanisms according to the invention are disclosed in U.S. Patent Application Ser. No. 61/810,931 filed on Apr. 11, 2013, which is hereby incorporated by reference in its entirety. In some embodiments, the cartridge assembly 100 is retained in a cartridge-assembly holder or base by clips, clamps, fasteners, combinations thereof, and the like.

FIG. 1B shows an exploded view of a cartridge assembly 100' having a support layer 110 and a resilient layer 120. The embodiment of FIG. 1B is substantially the same as the embodiment of FIG. 1A except that the partial channels 122 are disposed on the second surface 114 of the support layer 110 rather than the first surface 112 of the resilient layer 120. When the cartridge assembly 100' is assembled, the resilient layer 120 conforms to the second surface 114 of the support layer 110 such that contact between the resilient layer 120 and support layer 110 form a gas-tight or liquid-tight seal adjacent the partial channels 122 (e.g., the open rectangular or circular shape becomes closed), thereby forming channels 122' within the cartridge assembly 100'. The support layer 110 can be removably or permanently attached to the resilient layer 120. For example, the support layer 110 and resilient layer 120 can be removably attached using fasteners, clamps, clips, combinations thereof, and the like. For example, the support layer 110 and resilient layer 120 can be permanently attached using adhesives, welding, sonic welding, combinations thereof, and the like. Beneficially, the partial channels 122 formed in the support layer 110 are less likely to be deformed by high pressures or mechanical stresses than partial channels 122 within the resilient layer 120.

Figure 2A:
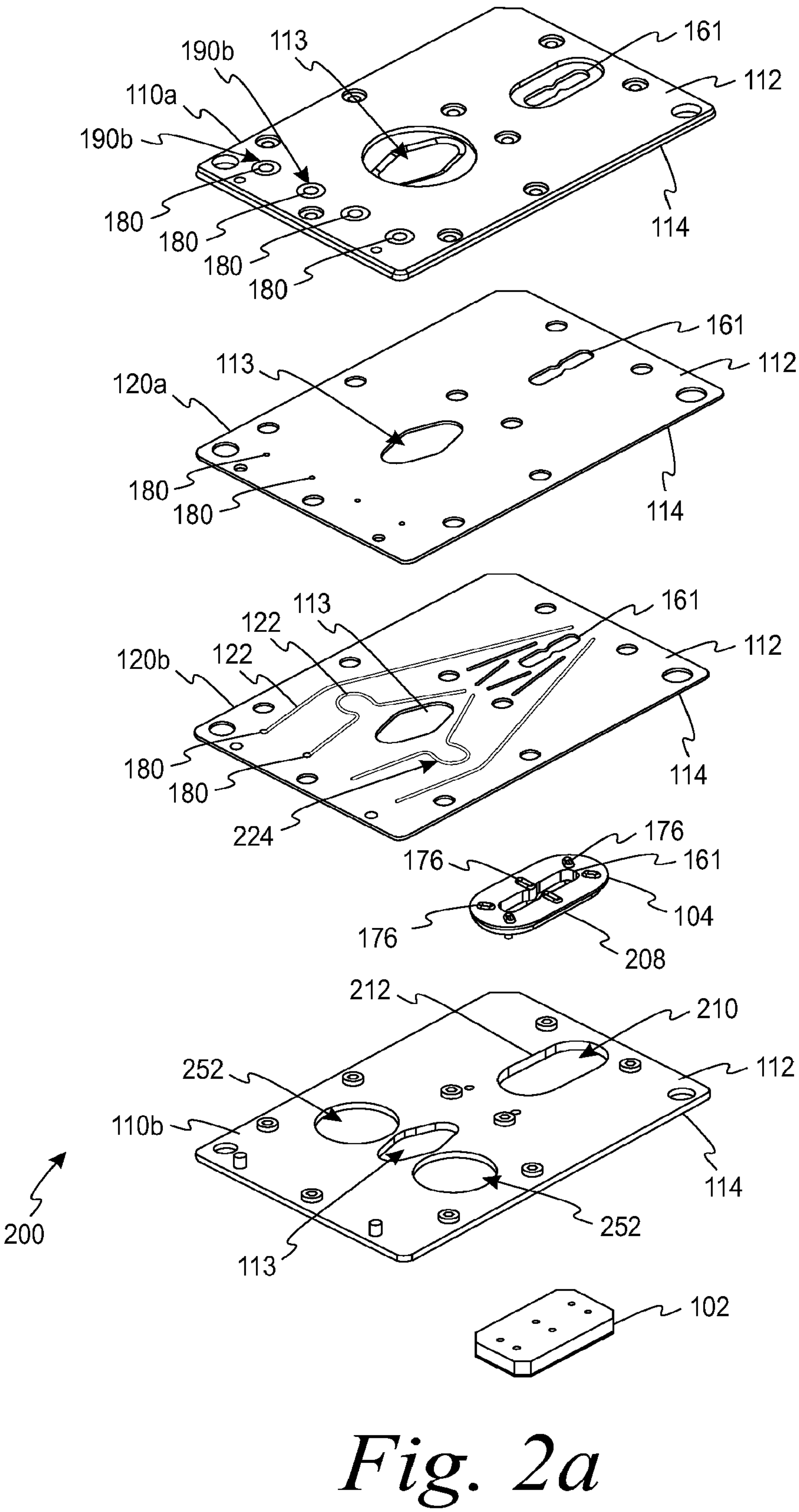
FIGS. 2A and 2B show exploded diagrammatic views of a cartridge assembly.

FIG. 2A shows an exploded view of a four-layer cartridge assembly 200 including a trapped interconnect adapter 104. The cartridge assembly 200 includes two support layers 110*a,b*, two resilient layers 120*a,b*, and an interconnect adapter 104. The first resilient layer 120*a*, the second resilient layer 120*b*, and the interconnect adapter 104 are disposed between the first support layer 110*a* and the second support layer 110*b*. When the cartridge assembly 200 is assembled, the first resilient layer 120*a* is disposed adjacent the first support layer 110*b* and the second resilient layer 120*b*. Also, the second resilient layer 120*b* is disposed adjacent the first resilient layer 120*a* and the second support layer 110*b*. Further, when the cartridge assembly 200 is assembled, the interconnect adapter is disposed between a portion of the second support layer 110*b* and the second resilient layer 120*b*.

The first support layer 110*a* and the first resilient layer each include a plurality of via holes 180. The each via hole 180 in the first support layer 110*a* is cooperatively aligned with a respective via hole 180 of the adjacent layer first resilient layer 120*a* such that fluid can flow between the input/output ports 190*a,b* and the channels 122' when the cartridge assembly 200 is assembled. The second resilient layer includes a plurality of via holes 180 to transfer fluid between the channels 122' and the interconnect adapter 104.

The interconnect adapter 104 includes a flange 208 disposed thereabout. The second support layer 110*b* includes trapping feature including an aperture 210 having a shoulder 212 therein. The inner periphery of the aperture 210 and shoulder 212 form a complimentary geometry to the outer periphery of the interconnect adapter 104 and flange 208 such that, the interconnect adapter 104 is prohibited from moving through the aperture 210 by engagement of the flange 208 with the shoulder 212. When the cartridge assembly 200 is assembled, the second resilient layer 120*b* traps the interconnect adapter 104 by biasing the flange 208 against the shoulder 212. This configuration allows the interconnect adapter 104 to be replaced if it becomes damaged or contaminated.

The second support layer 110*b* further includes pump apertures 252 configured to receive a pump head therein. The pump head and pump can be, for example, peristaltic, membrane, piezo, braille, impeller- and piston-type pumps, combinations thereof, and the like. At least a portion of the partial channels 122 is configured to be engaged by the drive element of the pump. In the illustrated embodiment, a portion 224 of the channel 122' is configured to be engaged by a pump head that follows a generally circular path. The pump head includes one or more elements that contact the second elastomeric layer 120*b* and deform the channel 122', which captures a volume of fluid and urges the fluid along the channel 122'. In some embodiments, the elements are rollers, and rotation of the pump head urges the volume of fluid forward through the fluid circuit. In some embodiments, the elements are closely placed members or "fingers" that extend laterally to compress the channel 122' and consecutive extension of the members urges the volume of fluid forward through the fluid circuit.

Figure 2B:
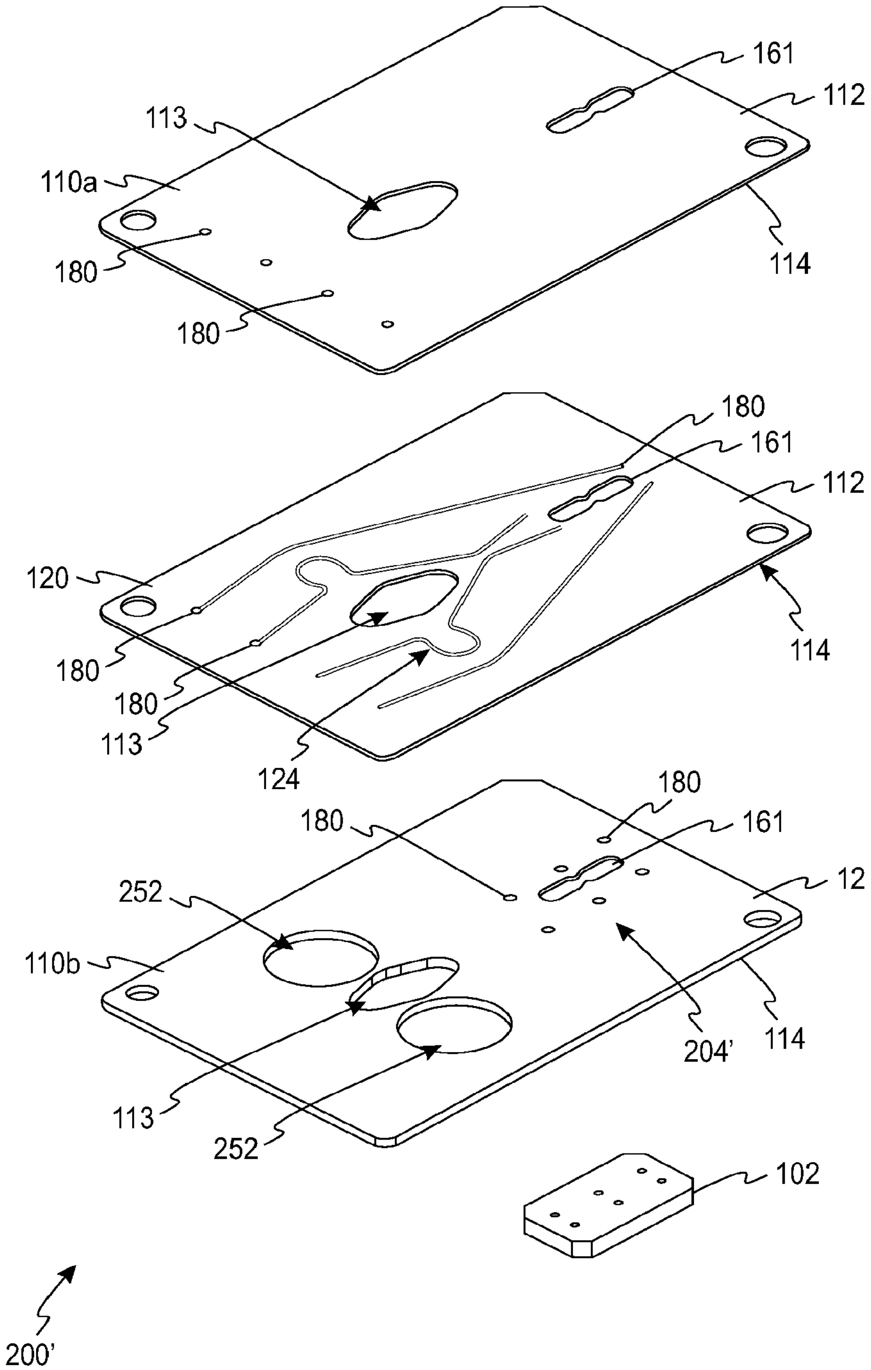

FIG. 2B shows an exploded view of a three-layer cartridge assembly 200' including an integrated interconnect adapter 204. The cartridge assembly 200' includes a first support layer 110*a*, a second support layer 110*b*, and a resilient layer 120. The resilient layer 120 is disposed between the first and the second support layers 110*a,b*. The second support layer 110*b* includes the integrated interconnect adapter 204. The integrated interconnect adapter 204 includes a plurality of via holes 180 disposed on the first surface 112 of the second support layer 110*b*. Each of the via holes 180 includes a corresponding nozzle (not shown) extending from the second side 114 of the second support layer 110*b*. The nozzles are configured to interface with one or more microfluidic devices 102 such that the cartridge assembly 200' establishes a fluidic connection between the cartridge assembly 100 and the microfluidic device.

Figure 3B:
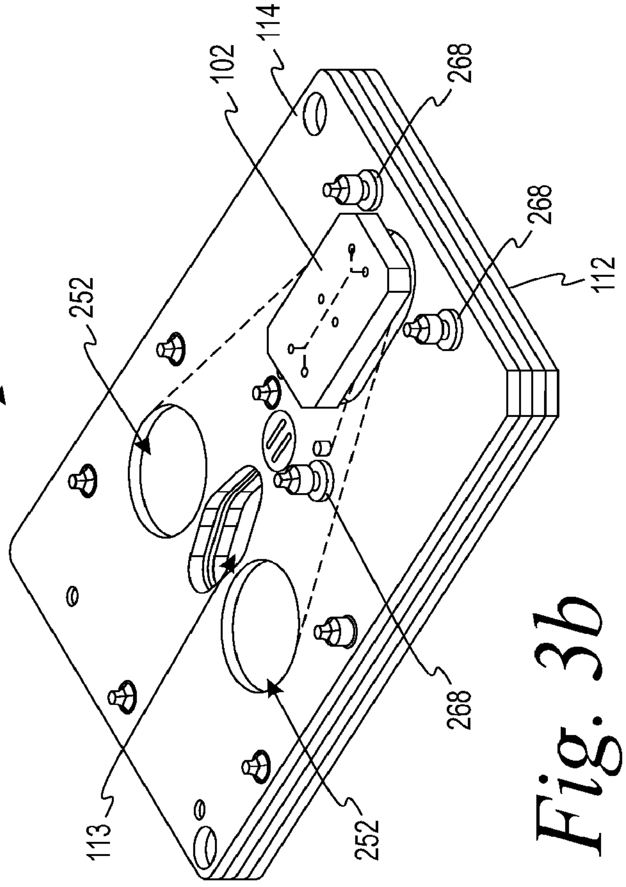
FIGS. 3A and 3B show an isometric view of the assembled cartridge assembly shown in FIGS. 2A and 2B.
Figure 3A:
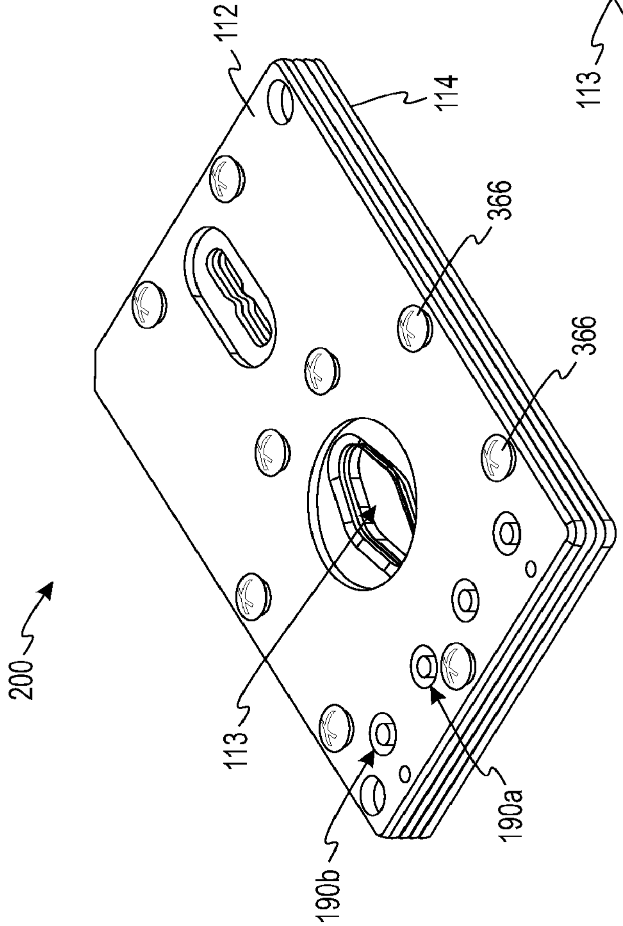

FIGS. 3A and 3B show an isometric view of the assembled cartridge assembly 200. FIG. 3A shows the cartridge assembly 200 generally from the first side 112. FIG. 3B shows the cartridge assembly generally from the second side 114. In the illustrated embodiment, the first support layer 110*a* is fastened to the second support layer 110*b*, with the first and second resilient layers 120*a,b* disposed therebetween, using nuts 268 and bolts 366.

Figure 4C:
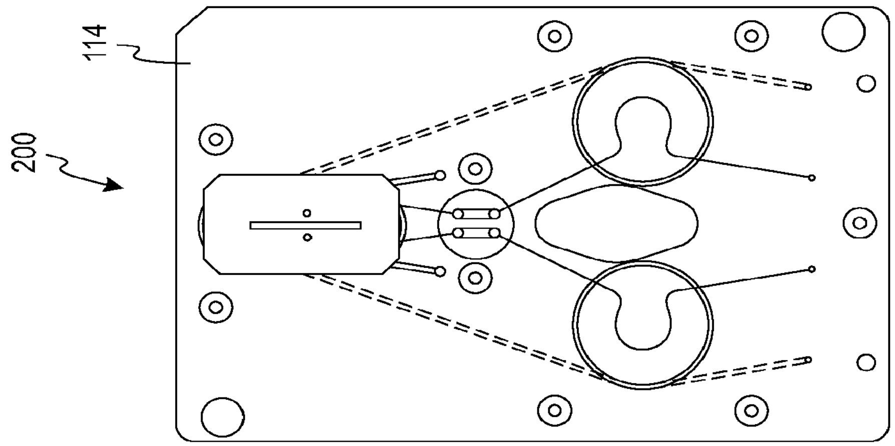
FIGS. 4A, 4B, 4C show plane views of the assembled cartridge assembly shown in FIGS. 2A, 2B, 3A, 3B.
Figure 4B:
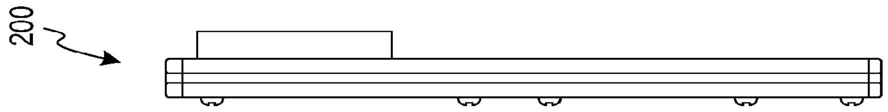
Figure 4A:
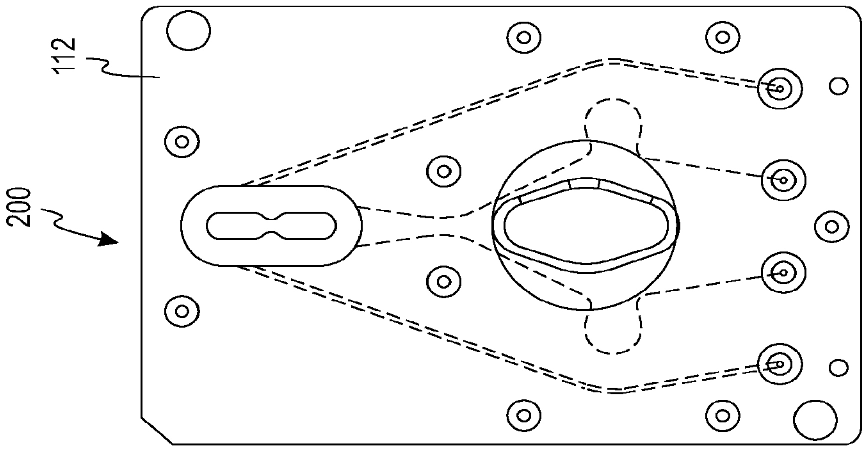

FIGS. 4A, 4B, 4C show plane views of the assembled cartridge assembly 200. FIG. 4A shows the cartridge assembly 200 from the first side 112. FIG. 4B shows the cartridge assembly 200 from a side view. FIG. 4C shows the cartridge assembly 200 from the second side 114. In the illustrated embodiment, microfluidic device 102 is formed from a clear or substantially transparent material that enables observation of the contents of one or more microfluidic channels in the microfluidic device 102 using, for example, microscopes. Examples of microscopes are described in International Application Number PCT/US14/44381, filed on Jun. 26, 2014, which is hereby incorporated by reference in its entirety.

Figure 5A:
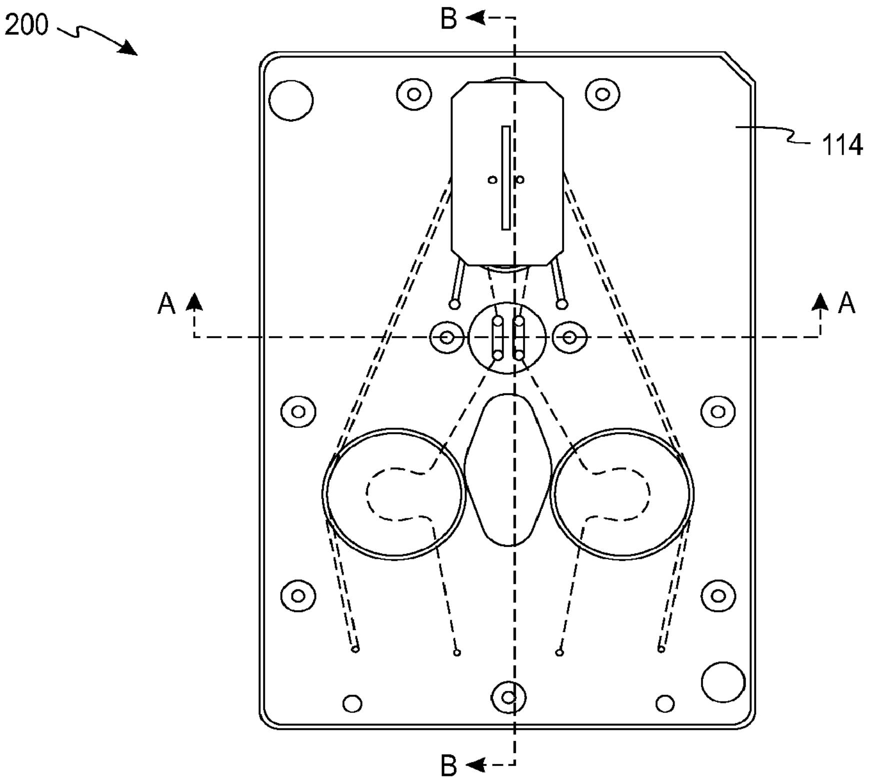
FIGS. 5A and 5B show a diagrammatic plane view of the cartridge assembly shown in FIGS. 2A, 2B, 3A, 3B, 4A, 4B, 4C and a detail view of the bubble trap.

FIG. 5A shows a diagrammatic plane view of a cartridge assembly 200 including a bubble trap 570 from the second side 114 of the cartridge assembly. The bubble trap 570 is configured to remove accumulated bubbles from the channels 122'. In the illustrated embodiment, the bubble trap 570 is disposed between the microfluidic device 102 and the portion 224 of the channel 122' that is configured to be engaged by a pump head. Fluid traveling from the inlet port 190*a* to the microfluidic device 102 travels through a first side of the bubble trap 570, while fluid traveling from the microfluidic device 102 to the outlet port 190*b* travels through a second side of the bubble trap 570.

Figure 5B:
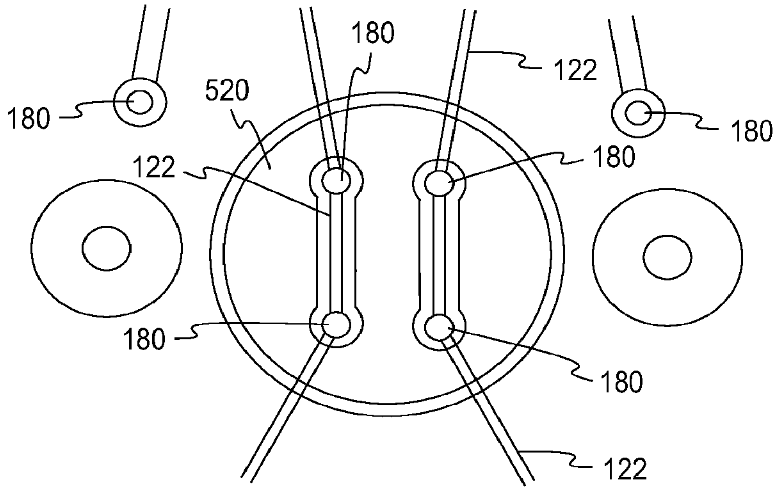

FIG. 5B shows a detail view of the bubble trap 570. The bubble trap 570 includes a gas-permeable membrane 520 and channels 122' in contact therewith. In the illustrated example, the gas-permeable membrane 520 is disposed in the second support layer 110*b* and extends from the second side 114 of the second support layer 110*b* at least part way to the first side 112 of the second support layer 110*b*. The gas-permeable membrane 520 can be any material that allows gas bubbles to pass through it without allowing the fluid to pass through. Examples of bubble traps and membranes are disclosed in U.S. Patent Application Ser. No. 61/696,997 filed on Sep. 5, 2012 and U.S. Patent Application Ser. Nos. 61/735,215, filed on Dec. 10, 2012, each of which is hereby incorporated by reference in its entirety.

The channels 122' are formed by gasketing embossments 176 (sometimes referred to as embossments) disposed on a second side of the second resilient layer 120*b*. The gasketing embossments 176 each form a partial channel 122 that connects two via holes 180. When the cartridge assembly 200 is assembled, the gasketing embossments 176 contact the gas-permeable membrane 520 to form channels 122'. When in operation, fluid passing through the channels 122' contacts the gas-permeable membrane 520. During contact, bubbles in the fluid traverse the membrane and escape the cartridge, while the fluid remains in the channels 122'.

Figure 6:
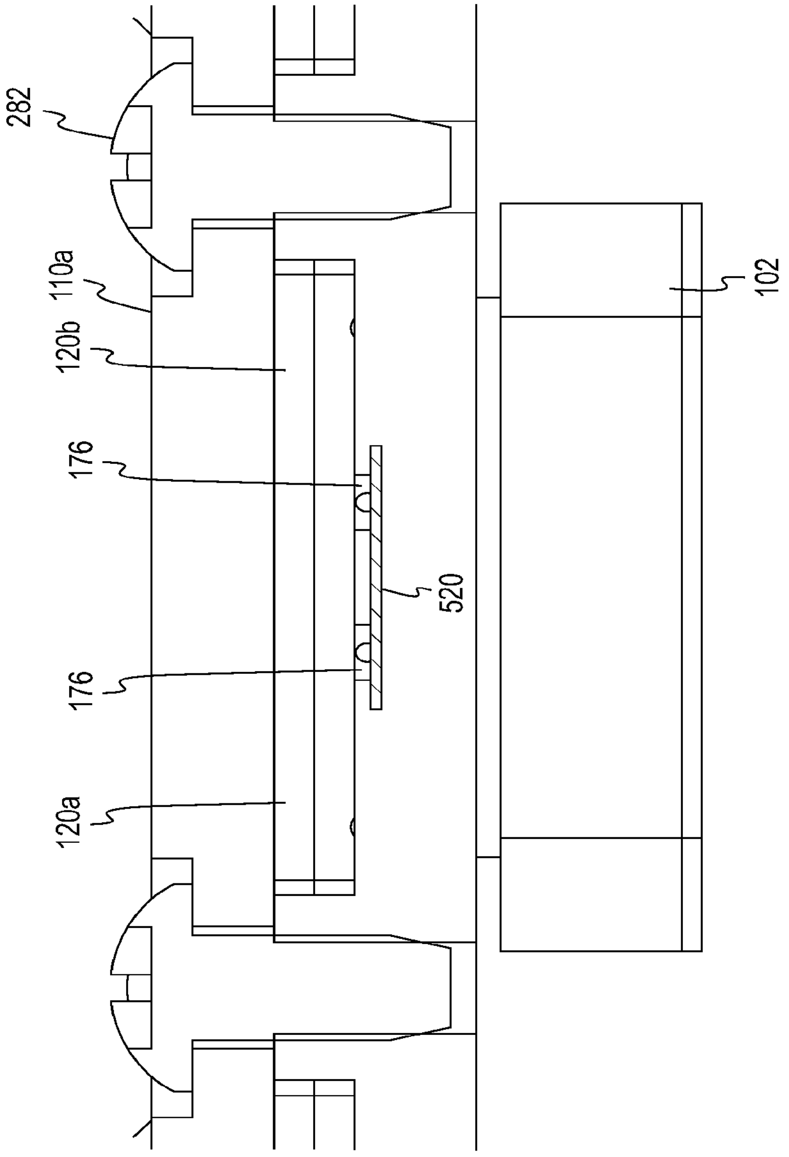
FIG. 6 shows a cross-section view of Section AA of FIG. 5A.

FIG. 6 shows a cross-section view along Section AA of FIG. 5A. Threaded fasteners 682 are used to compress the second resilient layer 120*b* against the second support layer 110*b*.

Figure 7:
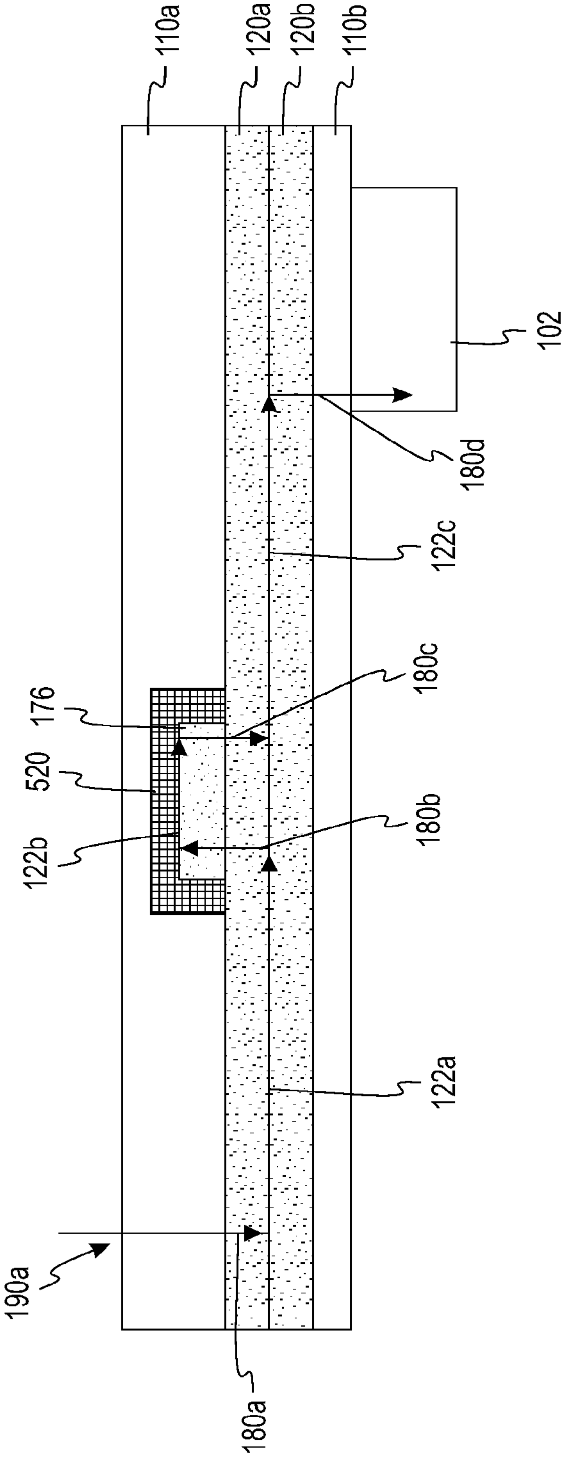
FIG. 7 shows a diagrammatic cross-section view of Section BB of FIG. 5A.

FIG. 7 shows a diagrammatic cross-section view along Section BB of FIG. 5A. While in operation, fluid enters the cartridge assembly through inlet port 190*a*. The fluid can be injected, pumped, or fed (e.g., by gravity) into the inlet port 190*a*. Alternatively, the fluid can be drawn into the inlet port 190*a* by a pump connected after the outlet of the microfluidic device 102.

A first via hole 180*a* carries the fluid through the first support layer 110*a* and the first resilient layer 120*a* to a first channel 122'*a* that travels along the interface of the first resilient layer 120*a* and the second resilient layer 120*b*. After traversing the first channel 122'*a*, the fluid enters a second via hole 180*b* that carries the fluid from the first channel 122'*a*, through the first resilient layer 120*a*, and to a second channel 122'*b* formed between the gasketing embossment 176 and the gas-permeable membrane 520. After traversing the second channel 122'*b*, the fluid enters a third via hole 180*c* that carries the fluid from the second channel 122'*b*, back through the first resilient layer 120*a*, and to a third channel 122'*c* that travels along the interface of the first resilient layer 120*a* and the second resilient layer 120*b*. After traversing the third channel 122'*c*, the fluid is carried through the second resilient layer 120*b* and the second support layer 110*b* to the microfluidic device 102 using via hole 180*d*. Similarly, fluid flowing out of the microfluidic device 102 can follow a similar pattern of via holes and channels that carry the fluid to the outlet port 190*b*.

Figure 8:
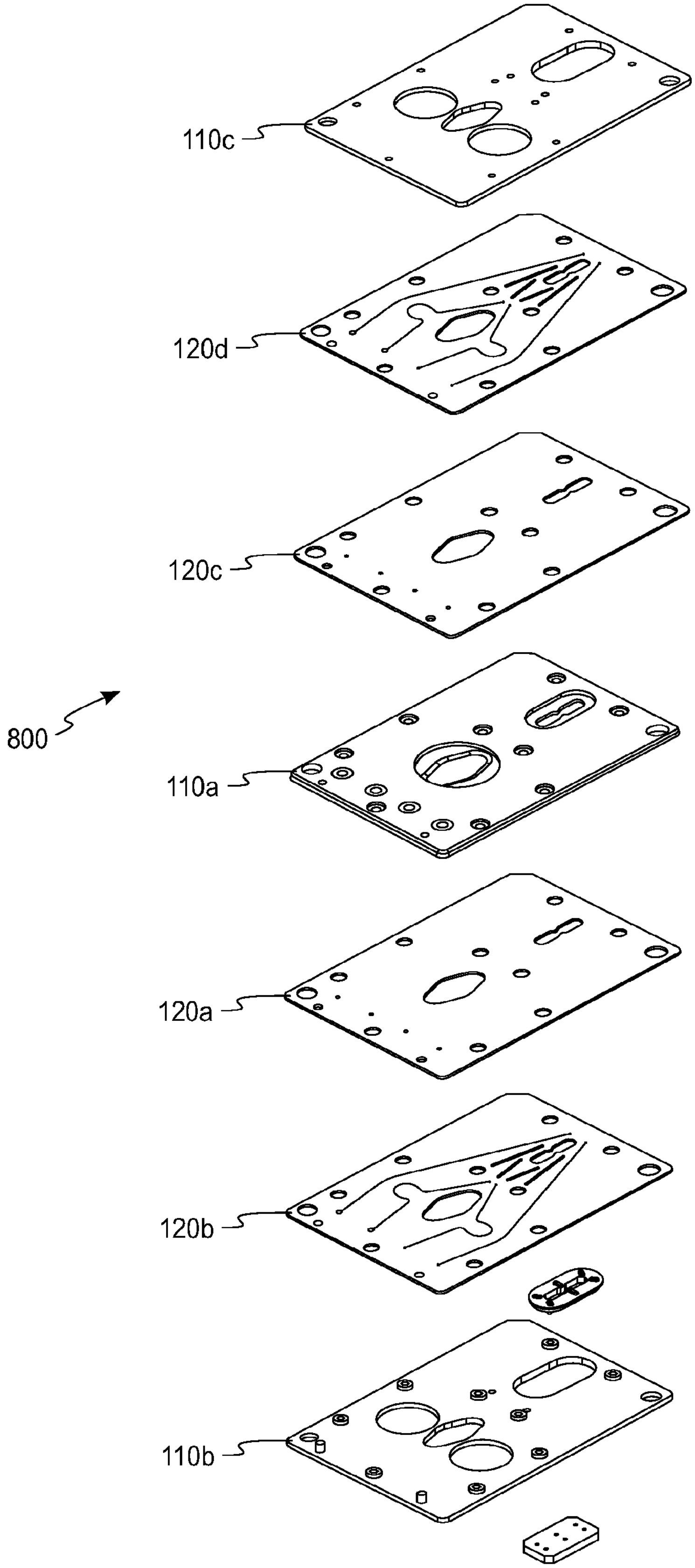
FIG. 8 shows an exploded diagrammatic view of a cartridge assembly.
Figure 9C:
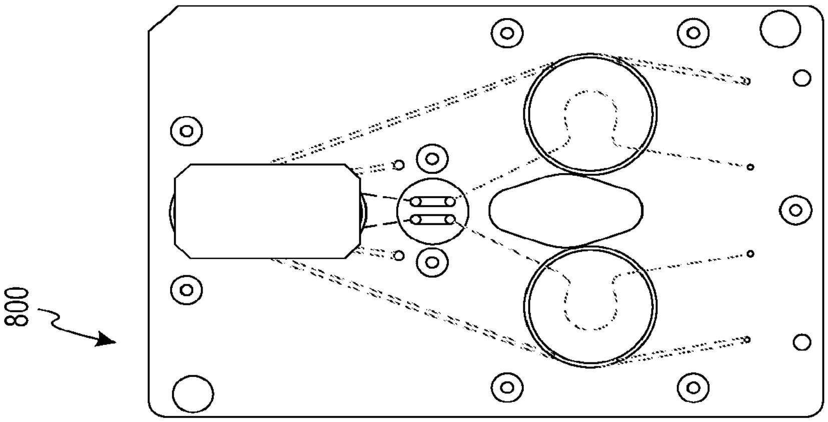
FIGS. 9A, 9B, 9C show plane views of the assembled cartridge assembly shown in FIG. 8.
Figure 9B:
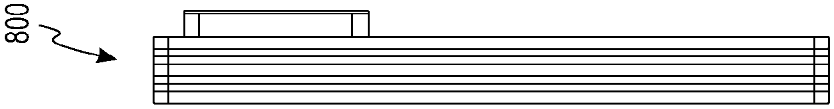
Figure 9A:
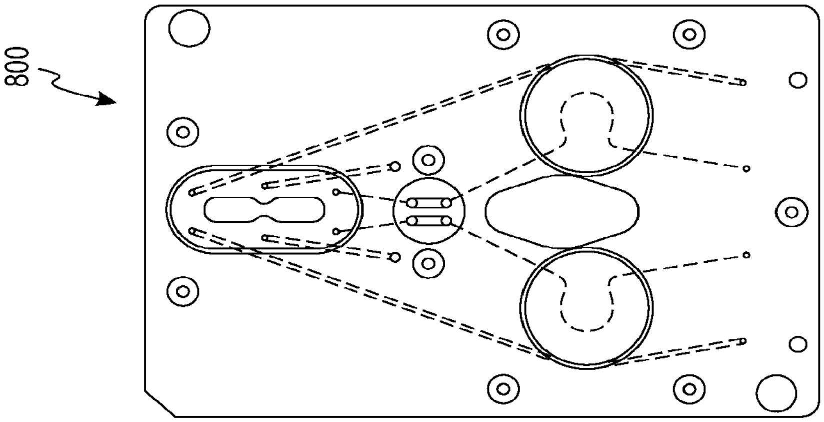
Figure 10B:
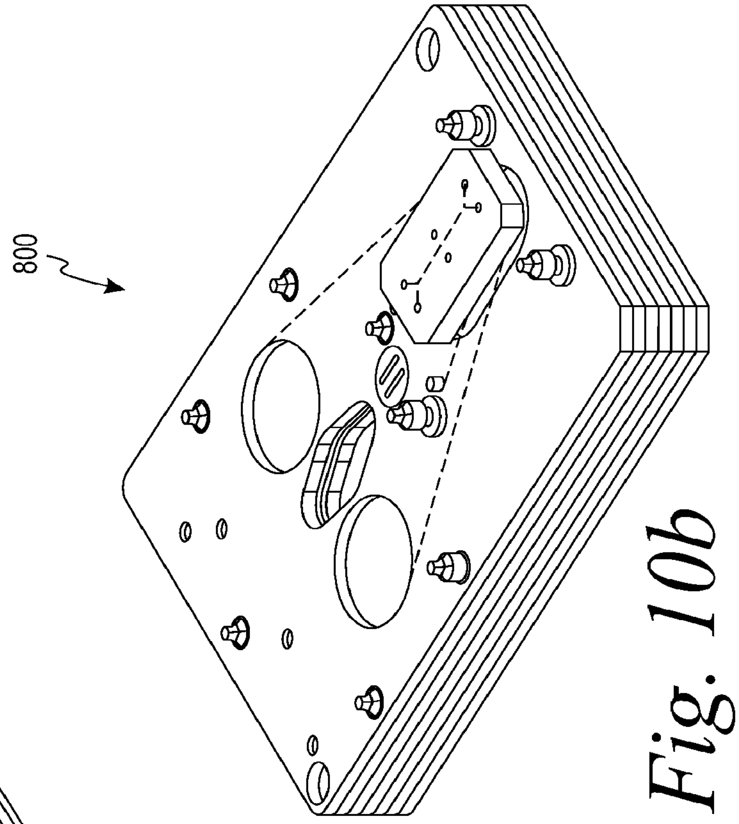
FIGS. 10A and 10B show an isometric view of the assembled cartridge assembly shown in FIG. 8.
Figure 10A:
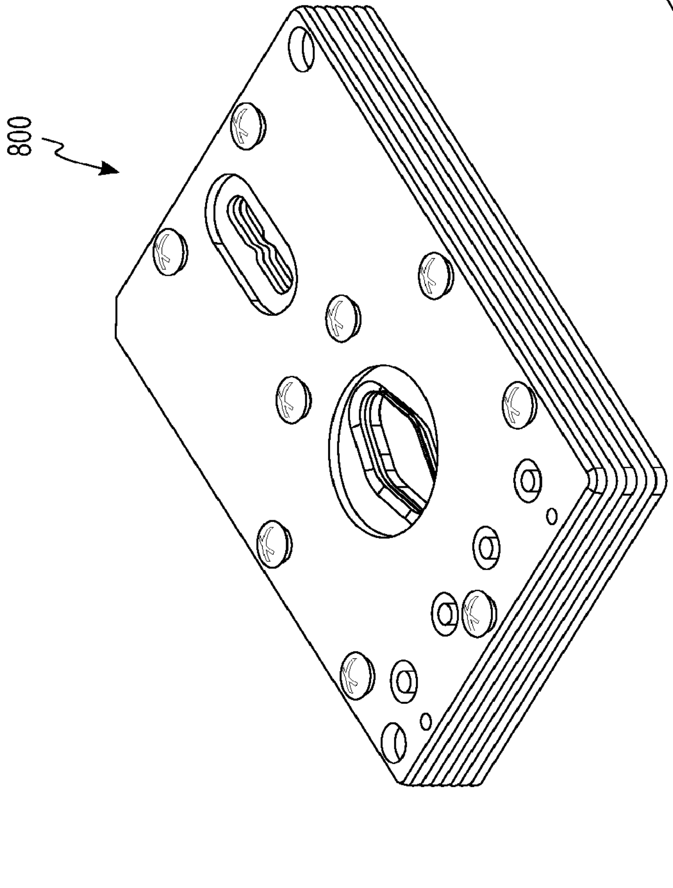

FIG. 8 illustrates a cartridge assembly 800 having a double-sided configuration. Beneficially, a double-sided cartridge assembly 800 can be used to connect additional inputs, outputs, microfluidic devices, or other elements to the cartridge assembly 800. The double-sided cartridge assembly 800 includes a central support layer 110*a*, two outer support layers 110*b,b'*, and four resilient layers 120*a-d*. The two leftmost resilient layers 120*a,b* are disposed between the central support layer 110*a* and the leftmost outer support layer 110*b*. The two rightmost resilient layers 120*c,d* are disposed between the central support layer 110*a* and the rightmost outer support layer 110*c*.

As shown in FIGS. 9A, 9B, 9C, 10A and 10B, the double-sided cartridge assembly 800 can include four inlet ports 190*a* and four pump apertures 252. The double-sided cartridge assembly 800 can be used to support a microfluidic device 102 902 that includes four separate channels, for example, in one microfluidic device, or to support multiple microfluidic devices. The multiple microfluidic devices may be disposed on the same side of the double-sided cartridge 800, or on different sides.

Figure 11A:
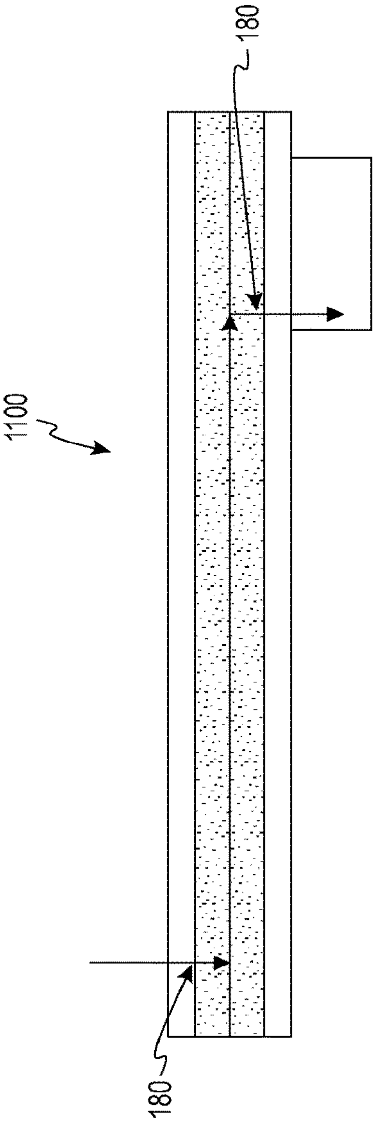
FIGS. 11A and 11B show the use of via holes in various embodiments.
Figure 11B:
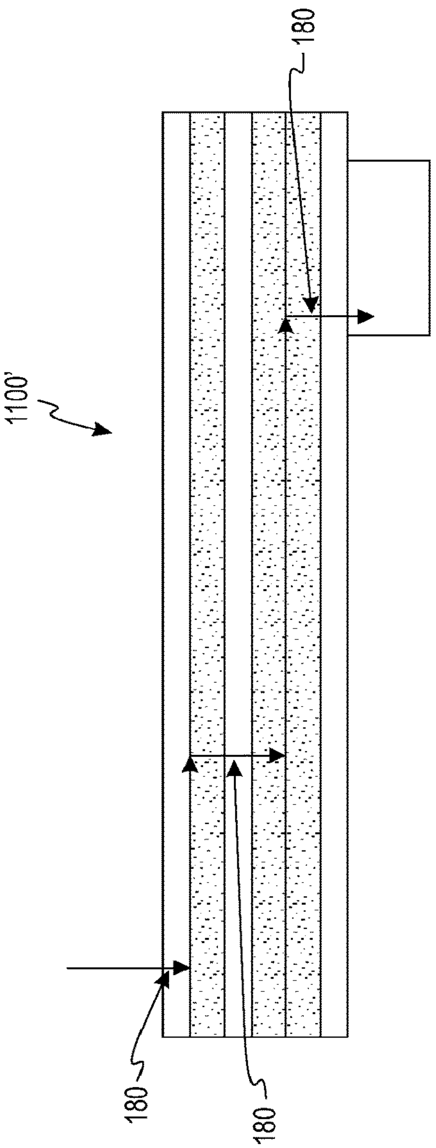

FIGS. 11A and 11B show the use of via holes 180 in various embodiments. FIG. 11A shows fluid flow in an example four-layer cartridge assembly 1100. FIG. 11B shows a six-layer cartridge assembly 1100'. As shown, the fluid can take a substantially direct path along a layer (FIG. 11A), or may pass along several layers (FIG. 11B). This allows a portion of the fluid flow path to avoid portions of the cartridge assembly that accommodate other pathways, microfluidic devices, functional elements, and the like. As also shown, the via holes 180 can traverse any desired number of layers.

Beneficially, sensor mechanisms can be incorporated into or integrally formed with the cartridge assembly. The sensor mechanisms are configured to detect one or more properties of the fluid such as conductivity, transmission, fluorescence, conductivity, composition, pressure, combinations thereof, and the like. The sensor mechanism can include one or more metal plates or electrodes that come in contact with the fluid along the flow path.

The flow path can include one or more sensor channels that direct the flow of fluid in contact with or adjacent to one or more electrodes or other sensors. The electrodes can be wired to one or more electronic sensing devices, such as ohm meters, and systems and devices that can perform electrical measurement, such as, trans-epithelial electrical resistance (TEER) sensing, electric cell-substrate impedance sensing (ECIS), or conductivity sensing, physical and/or chemical measurements such as pH, dissolved-oxygen concentration and osmolarity, or electrochemical measurements including glucose and/or lactate sensing.

In some embodiments, the sensor mechanism is used to apply electric currents or voltage to the fluid, or to induce electrical effects in the fluid using capacitive or inductive effects. This can be used, for example, for the pacemaking of cardiac cells or the stimulating of tissue, such as neuronal or muscular tissue.

In some embodiments, the sensor mechanism can include two or more sensor or electrode channels and the sensor mechanism can measure or apply electrical and biological properties of the fluid flowing in both sensor channels. In accordance with some embodiments, the metal can be biologically inert to the fluid or coated with a biologically inert material, such as gold, to prevent ions from being released into the fluid.

One advantage of routing fluids to sensor mechanisms using gasketing embossments 176 is that the fluid can be restricted to contact only the intended portion of the sensor or electrode. This feature can be useful to prevent the fluid from coming in contact with incompatible materials, such as those that are toxic or constituent absorbing. For example, the gasketing embossments 176 can be used to limit fluid contact to exposed metal surfaces provided on the surface of a PCB, thereby avoiding contact with the PCB's carrier material, which may be toxic or drug absorbing. The exposed metal surfaces can also be treated to make them non-toxic and non-absorbing to the fluid content or the biologic materials hosted in the device, for example, the metal surfaces can be passivated by gold plating. This enables the use of inexpensive PCBs in situations where they were previously unacceptable.

Figure 12A:
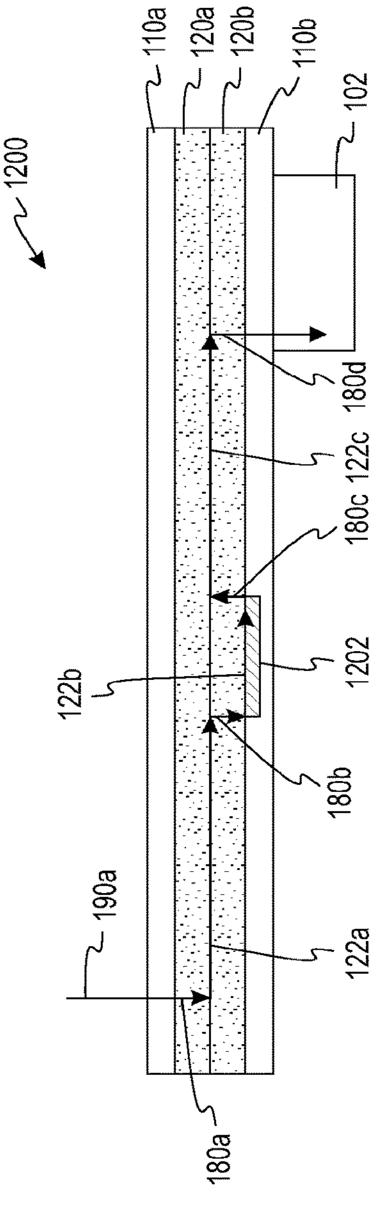
FIGS. 12A and 12B show the use of sensors in various embodiments.

FIG. 12A shows a cartridge assembly 1200 having a sensor mechanism 1202 configured to sense properties of the fluid as the fluid flows along the sensor mechanism 1202. The sensor mechanism 1202 is disposed on the first surface 112 of the second support layer 110*b*. The channel 122'*b* is formed from contact of partial channel 122*b* disposed on the second surface 114 of the second resilient layer 120*b* with the sensor mechanism 1202 such that the fluid can make direct contact with the sensor mechanism 1202.

Figure 12B:
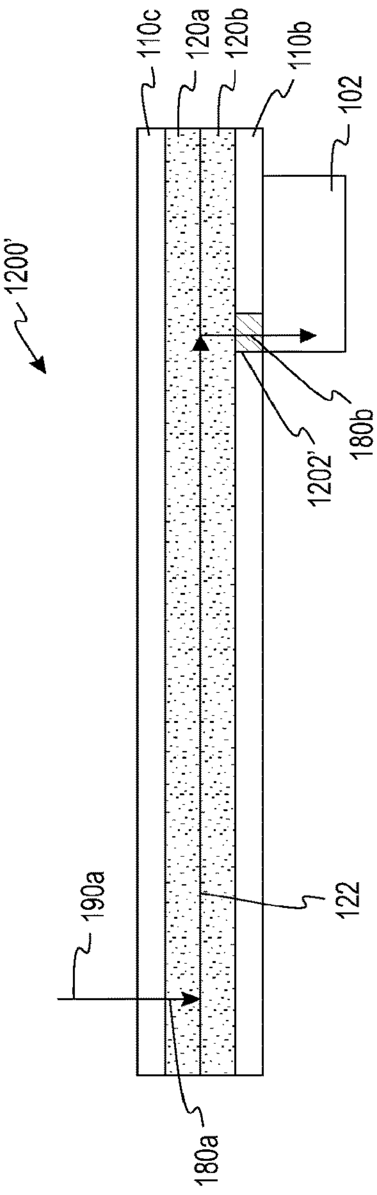

FIG. 12B shows a cartridge assembly 1200' having a sensor mechanism 1202' that is configured to sense properties of the fluid as the fluid flows through the sensor mechanism 1202'. The sensor mechanism 1202 is disposed within the second support layer 110*b* and extends from the first surface 112 of the second support layer 110*b* to the second surface 114 of the second support layer 110*b*. The second via hole 180*b* is disposed within the sensor mechanism 1202' such that the fluid comes in contact with the sensor mechanism 1202' when flowing toward the microfluidic device 102. In some embodiments, the second via hole 180*b* is formed from one or more metal tubes such that the fluid flowing through the second via hole 180*b* will come in contact with the metal tubes, which function as electrodes.

Figure 13B:
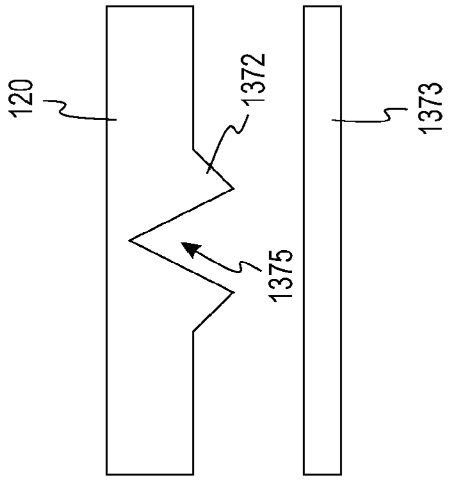
FIGS. 13A and 13B show diagrammatic detail views of gasketing embossments.
Figure 13A:
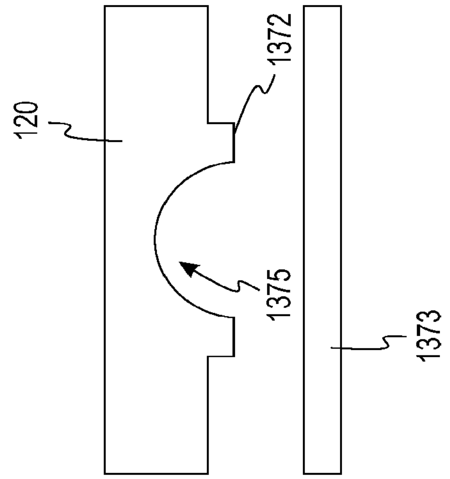

Referring now to FIGS. 13A and 13B, gasketing embossments 176 are shown. In some embodiments, a channel 122' is formed using a gasketing embossment 176 that is disposed on a surface of one of the layers within the cartridge assembly. In some embodiments, the gasketing embossments 176 include one or more gasket features 1372 that project from the surface and form a channel feature 1375. The channel feature 1375 can extend below the surface of the layer. When the layers of the cartridge assembly are assembled, the gasket features 1372 are pressed against an adjacent element such as a surface of the adjacent layer or functional element 1373 disposed within the adjacent layer to seal the channel feature 1375 and form the channel 122'. In some embodiments, one or more gasketing embossments 176 can be incorporated into the surface of the adjacent layer or functional element 1373.

In accordance with some embodiments, the gasketing embossments 176 can be compressed by a more rigid material or compress into a softer material to form a fluid or gas tight seal. The gasketing embossments 176 can be used to provide a seal around, for example, the nozzle holes 106 of interconnect adapter 104 to prevent fluid from leaking. In accordance with some embodiments, the gasketing embossments 176 are formed from a material that is more rigid than the resilient layer 120 and, when the interconnect adapter 104 is compressed into the resilient layer 120, the resilient layer 120 deforms around the gasketing embossments 176 to form a fluidic seal. In accordance with some embodiments, the gasketing embossments 176 can be formed from a material that is less rigid than the resilient layer 120, and the gasketing embossment 176 deforms around the corresponding via hole 180 when the interconnect adapter 104 is compressed into the resilient layer 120 to form a fluidic seal.

As shown in FIG. 13A, the channel feature 1375 can include curved walls. As shown in FIG. 13B, the gasket feature can include sharp features that contact the sealing element or sensor mechanism 1373, and the channel feature 1375 can have flat walls. The gasketing embossments can be formed using, for example, conventional molding and/or machining techniques, hot embossing, microthermoforming, etc.

Figure 14:
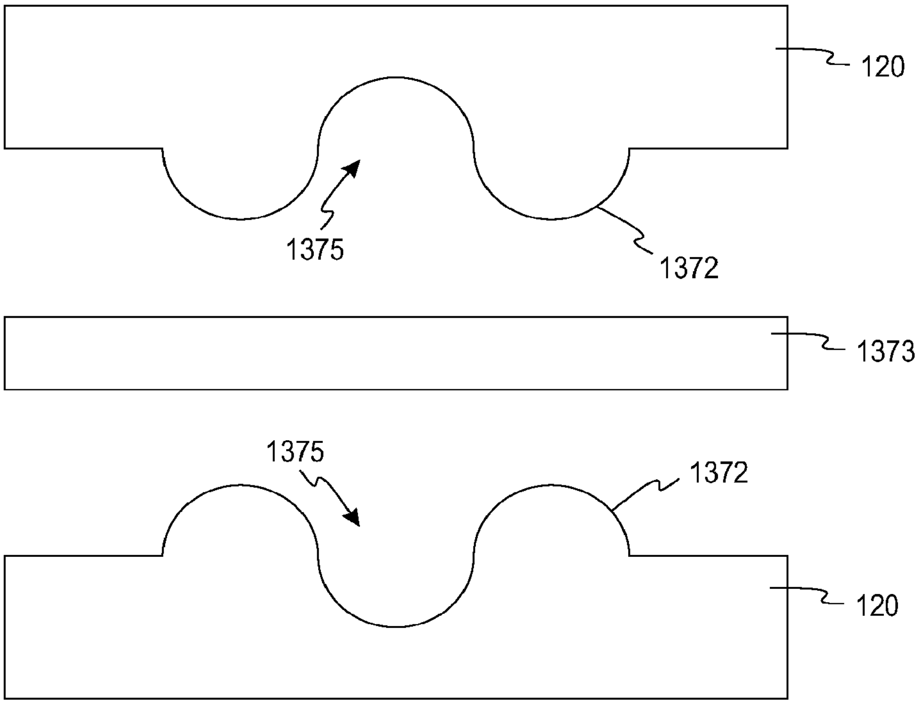
FIG. 14 shows a diagrammatic detail view of gasketing embossments.

FIG. 14 shows a diagrammatic sectioned view of an alternative embodiment of the functional area according to the invention. In some embodiments, the functional element 1473 can be engaged on each side by a separate gasketing embossment 176 that forms a separate fluidic channel 1475. One or more via holes 180 through the functional element 1473 can be provided in some embodiments. In some embodiments, the functional element 1473 can include a PCB that forms all or part of one of the layers of the cartridge assembly 1400. In some embodiments, the functional element can include (or be replaced by) a membrane, such as for example, a selectively permeable membrane to enable the transfer of ions, molecules and/or cells between sensing channels.

Figure 15A:
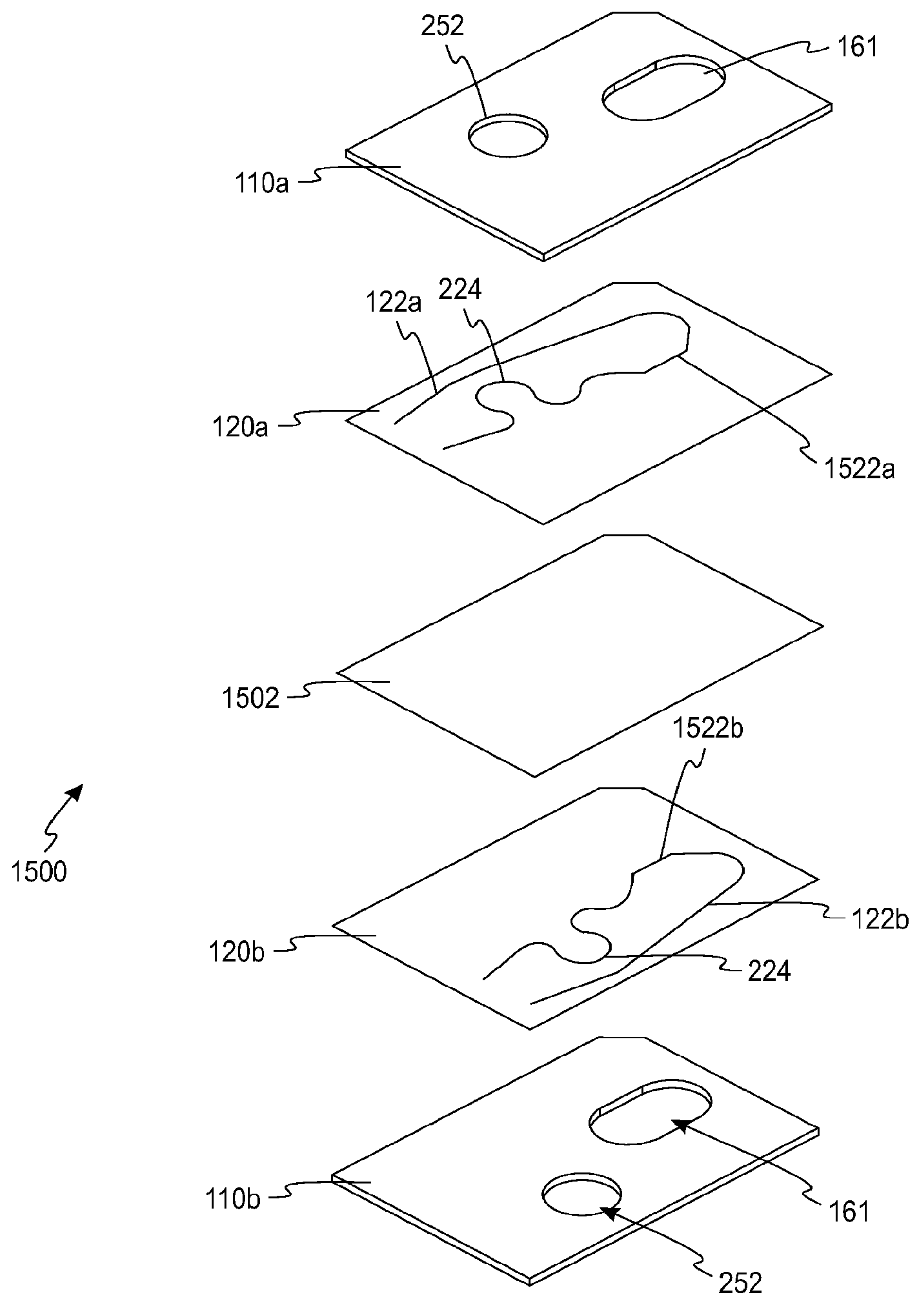
FIGS. 15A, 15B and 15C show diagrammatic views of a cartridge assembly having an integrated microfluidic device.
Figure 15B:
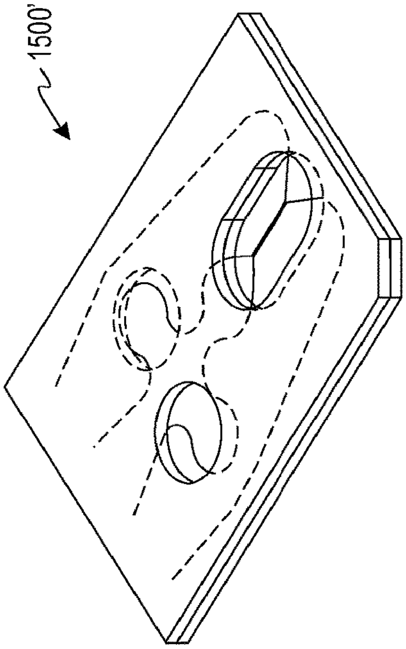
Figure 15C:
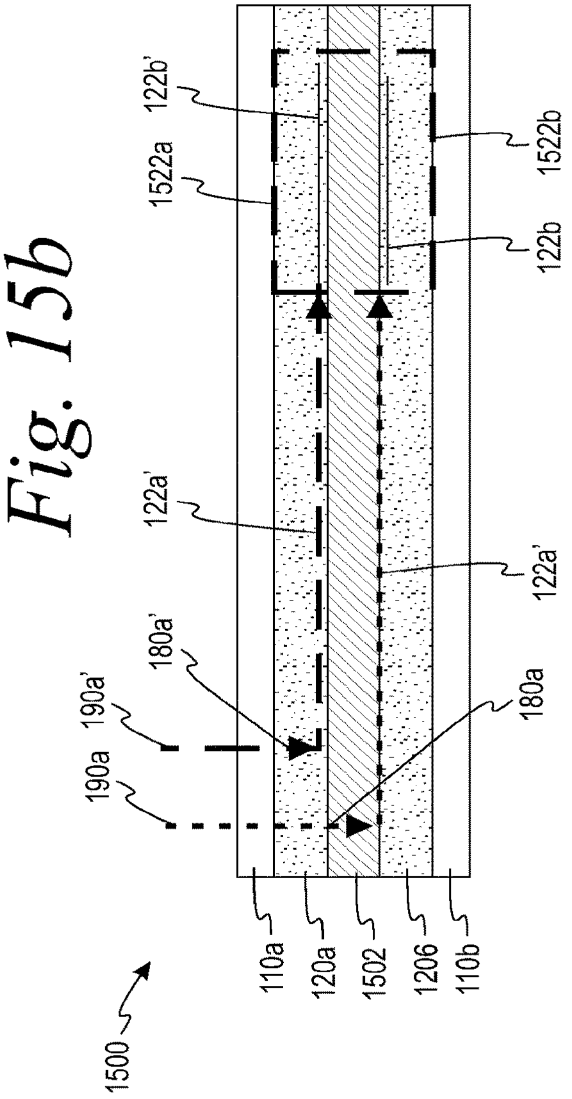

FIGS. 15A, 15B and 15C show diagrammatic views of a cartridge assembly 1500 having an integrated microfluidic device 102. The microfluidic device 102 (e.g., organ-chip) is integrated into the cartridge assembly 1500 such that the cartridge assembly 1500 and microfluidic device 102 are part of the same monolithic structure. The cartridge assembly 1500 includes resilient layers 120*a,b* sandwiched between support layers 110*a* and 110*b*. In addition, a membrane layer 1502 is disposed between the resilient layers 120*a,b*. While the membrane layer 1502 is shown as extending between the entire extent of resilient layers 120*a,b*, a smaller membrane layer 1502 that extends over only a portion of the cartridge assembly 1500 can be used. When the membrane layer 1502 extends over an area less than the entire surface of the resilient layers 120*a,b*, one or both of the resilient layers 120*a,b* include can include a recess in the area that overlaps the membrane to accommodate the thickness of the membrane layer 1502 while maintaining a uniform thickness of the cartridge assembly 1500.

The resilient layers 120*a,b* can include partial channels 122 to guide fluid toward and away from the microfluidic device 102 that is formed by the portions 1522*a,b* of partial channels 122.

In some embodiments, the microfluidic device 102 portion of the cartridge assembly 1500 includes additional channels for air pressure to modulate at least a portion of the membrane. In some embodiments, the microfluidic device 102 portion includes engagement elements on one or both sides of the partial channels 122 to enable mechanical modulation. The engagement elements can include, for example, one or more holes, pins or ridges to enable a modulation device to modulate the membrane.

FIG. 15A shows an exploded view of the cartridge assembly 1500. As shown, the first resilient layer 120*a* and the second resilient layer 120*b* include partial channels 122*a,b* that have a partially complementary pattern. When assembled, the fluid in the first channel 122'*a* interacts with the fluid in the second channel 122'*b* only in the complementary portions 1522*a,b* of the channels 122'*a,b*, respectively. Each support layer includes one pump aperture 252 such that a drive element is received on each side of the cartridge assembly 1500.

FIG. 15B shows a cartridge assembly 1500' pump apertures are disposed on the same side of the cartridge assembly 1500'.

FIG. 15C shows a diagrammatic cross-section view of the integrated cartridge assembly 1500 having an integrated microfluidic device 102. The cartridge assembly includes a first support layer 110*a*, a first resilient layer 120*a*, a membrane layer 1502, a second resilient layer 120*b*, and a second support layer 110*b*, respectively. The flow paths through the circuit are shown diagrammatically, where dotted and dashed lines indicate flow paths out of the cross-sectional plane, and lines are flow paths that are in the cross-sectional plane.

The first working fluid is fed into the cartridge assembly 1500 through inlet port 190*a* and traverses the first support layer 110*a*, the first resilient layer 120*a*, and the membrane layer 1502 using the first via hole 180*a*. The first working fluid then traverses the first channel 122'*a* that is disposed between the membrane layer 1502 and the second resilient layer 120*b*. During this traversal, the flow path moves into and travels along the cross-sectional plane in the complementary portion 1522*b*.

Simultaneously, the second working fluid is fed into the cartridge assembly 1500 through inlet port 190' and traverses the first support layer 110*a* and the first resilient layer 120*a* using the first via hole 180*a'*. The second working fluid then traverses the first channel 122'*a'* that is disposed between the membrane layer 1502 and the first resilient layer 120*a*. During this traversal, the flow path moves into and travels along the cross-sectional plane in the complementary portion 1522*a*.

During travel through the complementary portions 1522*a, b*, the first and the second working fluid can interact with the membrane, and with each other. Depending on the application, the membrane 1502 may have a porosity to permit the migration of cells, particulates, proteins, chemicals and/or media between the first working fluid and the second working fluid.

While the above-described gasketing embossments have been described as forming a channel between two via holes, it is contemplated that the gasket feature can encircle one or more via holes to contact a sensor mechanism positioned at the end of the via hole.

Further examples of sensor elements that can be used with aspects of the present disclosure are printed circuit boards (PCBs) or portions thereof. A PCB can be mounted on the cartridge assembly, e.g., to the outer later. In some embodiments, the second via hole 180*b* shown in FIG. 12B includes the via hole of a PCB. This can be useful, for example, because metalized via holes are commonly manufactured in standard PCB processes. In addition, the PCB via can be passivated by gold plating. In some embodiments, the PCB can form all or a portion of one of the support layers. In some embodiments the sensor mechanism 1202 includes one or more flexible electronic circuits. The flexible electronic circuit can be integrated into one or more of the resilient layers 120. In some embodiments, the PCBs and/or flexible electronic circuits are integrated into two layers of the cartridge assembly that are adjacent or non-adjacent layers. Electrical connectors can be used to make electric connections between the circuits integrated into the layers of the cartridge assembly. In some embodiments, the sensor mechanism 1202 includes one or more optical fibers or waveguides that transmit visible or invisible electromagnetic radiation into the sensor region to irradiate the fluid and/or transmit electromagnetic radiation released and/or reflected by, or transmitted through the fluid to optical and imaging sensors and devices. In some embodiments, the sensor region can include a window adapted for optical interrogation by external equipment. Examples of optical sensors that can be used externally or integrated into the cartridge assembly include surface-plasmon based sensors, optical resonators, thin-film interference sensors, interferometer sensors (including ones based on Mach-Zehnder interferometers), etc.

Further examples of interconnect adapters 104 that can be used with aspects of the present disclosure are described in U.S. Patent Application No. 61/839,702, filed on Jun. 26, 2013, which is hereby incorporated by reference in its entirety.

Further examples of pumps that can be used with aspects of the present disclosure are described in PCT Application No. PCT/US2011/055432, filed on Oct. 7, 2011, U.S. patent application Ser. No. 13/183,287, filed on Jul. 14, 2011, and U.S. Patent Application Ser. No. 61/735,206, filed on Dec. 20, 2012, each of which is hereby incorporated by reference in its entirety.

As used herein, microfluidic devices are generally devices that include channels configured to carry fluids between components. In some embodiments, the cross-sectional distance of the partial channels 122 ranges from about 1.0 micron to about 10,000 microns. In some embodiments, the cross-sectional distance of the partial channels 122 ranges from about 100 microns to about 1000 microns. In some embodiments, the cross-sectional depth of the partial channels 122 ranges from about 10 microns to about 2500 microns.

While reference has been made to a microfluidic device 102 above, it is understood that aspects of the present invention may be employed in any fluidic system (microfluidic or non-microfluidic). Furthermore, aspects of the present invention allow organs, tissues, or cell types and the interactions therebetween to be studied using one or more fluidic devices (e.g., microfluidic or non-microfluidic cell culture devices). For example, an inflammatory response in a first organ can cause a response in a second organ, which in turn may affect a biological function of the second organ or how the second organ responds to a drug. Aspects of the present invention allow one to simulate and study ex vivo the response of the second organ to such stimulus which may occur in vivo. Microfluidic devices that are used to mimic aspects of a biological cell system, e.g., a tissue type or organ, are also referred to organs-on-chips or organ-chips.

While the cartridge assembly is shown as being flat or planar, the cartridge assembly can be formed in other, non-planar configurations. For example, the cartridge assembly can be formed in a curved or bent configuration.

While the above-described partial channels include an open microfluidic surface abutting an adjacent layer, it is contemplated that the partial channels may be formed within a single layer using, for example, 3D-printing. Moreover, while the above-described cartridge assemblies have been described as including two or more layers, it is contemplated that the cartridge assemblies may be unitary component formed using, for example, 3D-printing.

Other embodiments are within the scope and spirit of the invention. For example, the cartridge assembly may include only support layers, only resilient layers, or any arrangement of support layers and resilient layers. Features implementing functions can also be physically located at various positions, including being distributed such that portions of functions are implemented at different physical locations or orientations.

In some embodiments, the cartridge assemblies can be seated into and removed from a cartridge-assembly holder that can establish fluidic connections upon or after seating and optionally seal the fluidic connections upon removal. In some embodiments, manual fluidic connections can be created in addition to or instead of the connections created upon seating. In accordance with some embodiments, inlet and outlet ports can be provided to enable fluid to be manually or automatically (e.g., robotically) injected into or withdrawn from the cartridge assembly.

In some embodiments, the cartridge assembly can be used to facilitate the connection of microfluidic devices, such as organ-on-a-chip devices, to other fluidic components including pumps, valves, bubble traps, mixers, fluid storage reservoirs, fluid collection devices, sensors, analytical instrumentation, and other microfluidic devices, including other organ-on-a-chip and lab-on-a-chip devices. In some embodiments, one or more microfluidic devices can be incorporated into the cartridge assembly. This may be done, for example, to reduce the number of interconnections or to reduce the number of parts for manufacture. Examples of organ-on-a-chip or organ-chip devices that can be used in the methods and systems according to the invention include, for example, in U.S. Provisional Application No. 61/470,987, filed Apr. 1, 2011; No. 61/492,609, filed Jun. 2, 2011; No. 61/447,540, filed Feb. 28, 2011; No. 61/449,925, filed Mar. 7, 2011; and No. 61/569,029, filed on Dec. 9, 2011, in U.S. patent application Ser. No. 13/054,095, filed Jul. 16, 2008, and in International Application No. PCT/US2009/050830, filed Jul. 16, 2009 and PCT/US2010/021195, filed Jan. 15, 2010, the contents of each application is incorporated herein by reference in its entirety. Muscle organ-chips are described, for example, in U.S. Provisional Patent Application Ser. No. 61/569,028, filed on Dec. 9, 2011, U.S. Provisional Patent Application Ser. No. 61/697,121, filed on Sep. 5, 2012, and PCT patent application titled "Muscle Chips and Methods of Use Thereof," filed on Dec. 10, 2012 and which claims priority to the U.S. provisional application No. 61/569,028, filed on Dec. 9, 2011, U.S. Provisional Patent Application Ser. No. 61/697,121, the contents of each application is incorporated herein by reference in its entirety. The organ-chips can also include control ports for application of mechanical modulation (e.g., side chambers to apply cyclic vacuum, as in the Lung Chip described in the PCT Application No.: PCT/US2009/050830) and electrical connections (e.g., for electrophysiological analysis of muscle and nerve conduction). A similar approach of producing the Lung Chips with or without aerosol delivery capabilities (which can be extended to produce other organ-chips, e.g., heart chips and liver chips) is described, e.g., in the PCT Application No.: PCT/US2009/050830 and U.S. Provisional Application Nos.: 61/483,837 and 61/541,876, the contents of each application is incorporated herein by reference in its entirety. Examples of cartridge assemblies are described in, for example, PCT Application No. PCT/US2012/068725, filed Dec. 10, 2012 and U.S. Provisional Application No. 61/696,997, filed on Sep. 5, 2012 and No. 61/735,215, filed on Dec. 10, 2012, contents of each application is incorporated herein by reference in its entirety.

In some embodiments, organ-chip devices can be relatively small microfluidic devices making them difficult to handle and because of their small size, difficult to incorporate into microfluidic systems. Further, once these devices are incorporated into a system, it is also difficult to remove the microfluidic devices from one system and connect them to another system. In some embodiments, the microfluidic device, such as an organ-chip device can be incorporated into or connected to a cartridge assembly that can include one or more partial channels 122 that facilitate the connection of the microfluidic device to external components, such as pumps, valves, mixers, other microfluidic devices and microfluidic interconnection devices and systems. In addition to facilitating the connection of microfluidic devices into microfluidic systems, the cartridge assembly can also facilitate the safe handling and transport of the microfluidic device. In some embodiments, the cartridge assembly can include valves and/or seals that enable the cartridge assembly carrying the microfluidic device to be removed from the microfluidic system while preventing fluid leakage. The valves and/or seals can also prevent contamination of the fluids and other materials contained within the partial channels 122 and the microfluidic device.

In accordance with some embodiments of the present invention, the microfluidic device (e.g., organ-chip device) can be connected to the cartridge assembly by an interconnect adapter that connects some or all of the inlet and outlet ports of the microfluidic device to partial channels 122 or ports on the cartridge assembly. Some examples interconnect adapters are disclosed in U.S. Patent Application Ser. No. 61/839,702, filed on Jun. 26, 2013, which is hereby incorporated by reference in its entirety. The interconnect adapter can include one or more nozzles having fluidic channels that can be received by ports of the microfluidic device. The interconnect adapter can also include nozzles having fluidic channels that can be received by ports of the cartridge assembly.

In some embodiments, the microfluidic interconnection devices and systems can include manual and automated fluid collection robots that can collect fluid output by one microfluidic device or cartridge assembly and transfer the fluid to another microfluidic device or cartridge assembly. Examples of fluid interconnect devices are disclosed in U.S. Patent Application Ser. No. 61/845,666, filed on Jul. 12, 2013 which is hereby incorporated by reference in its entirety.

In some embodiments, the microfluidic pumps and valves can include peristaltic pumps, membrane pumps and valves as well as impeller and piston type pumps and valves and globe and gate valves. Examples of pumps and valves are described in PCT Application No. PCT/US2011/055432, filed on Oct. 7, 2011, U.S. patent application Ser. No. 13/183,287, filed on Jul. 14, 2011, and U.S. Patent Application Ser. No. 61/735,206, filed on Dec. 20, 2012, each of which is hereby incorporated by reference in its entirety.

The partial channels 122 can be formed in the adjoining surface by machining, etching, casting, molding, laser cutting, photolithography, photocuring and/or hot embossing.

In accordance with some embodiments, the partial channels 122 can have width in a range from 10 microns to 10000 microns or more and can have a depth in a range from 10 microns to 2500 microns or more.

The via holes can be molded or formed into the layer or created by a separate machining (e.g., drilling), etching, or laser cutting operation.

In some embodiments, the via holes can be tapered, having a different diameter at each surface.

In some embodiments, the via holes can be precisely sized with respect to the partial channels 122 to prevent the formation of pockets or dead space where cells and other biologic materials can become trapped and potentially contaminate or otherwise adversely impact the operation of the device.

In some embodiments, some of the layers can be fabricated from rigid materials including stiff elastomeric materials, acrylic, polystyrene, polypropylene, polycarbonate, glass, epoxy-fiberglass, ceramic and metal, and some of the layers can be fabricated from elastomeric materials such as styrene-ethylene/butylene-styrene (SEBS), silicone, polyurethane, and silicones including polydimethylsiloxane (PDMS). Other suitable materials include biocompatible materials that can support cell culturing and resist absorption and/or adsorption of drugs and chemicals. In accordance with some embodiments, specific materials can be preferred for use with specific cell types and drug types. In some embodiments, one layer can be formed by combining two or more different materials, for example, where one portion of a layer can be fabricated from SEBS and the remainder of the layer can be formed from acrylic or one portion of a layer can be fabricated from an elastomeric formulation of SEBS and the remainder from a rigid formulation of SEBS. In some embodiments where different materials are used for adjoining layers, the materials should be compatible with each other. The microfluidic cartridge assembly 200 as an assembly can be held together by thread forming screws, nuts and bolts, clips, clamps, pins as well as or in addition to the use of heat staking, glue (e.g., biocompatible, low absorption adhesives), welding and various forms of bonding (e.g. thermal, solvent-activated, UV activated, ultrasonic).

In some embodiments, each of the layers can be fabricated by molding and/or machining (e.g., including mechanical cutting, laser cutting and etching) the various features into each layer. The layers can also be fabricated using rapid prototyping technologies, such as 3 dimensional printing and stereolithography. In accordance with some embodiments, 3 dimensional printing, stereolithography, and/or photolithography can be used to fabricate the mold forms that can be used to produce each of layers. Other well-known mold fabrication methods, such as machining, casting and stamping can also be used.

In accordance with some embodiments, some of the layers can be different sizes and shapes than other layers. In some embodiments, the rigid support layers can be longer and/or wider than the other resilient layers, for example, to facilitate mounting into cartridge-assembly holders and systems. In some embodiments, the resilient layers can be longer and/or wider than the rigid support layer, for example, to provide support only where useful or to enable one or more partial channels 122 to pass under a microscope or other imaging or analysis device. Within a single layer, different portions of the layer can have different physical and/or chemical properties, such as elasticity, hardness, affinity to attract or repel components of the fluid and porosity. This can be accomplished by separately treating the desired portions to have the desired properties, molding together different materials into a single layer and/or using multiple pieces to make up any particular layer. In some embodiments, one or more layers included in the cartridge assembly feature modulating thickness, raised or lowered features and/or varying topology in one or more locations. Accordingly, one or more surfaces of said one or more layers need not be flat and may be curved or shaped in an arbitrary manner. For example, a layer may include one or more nozzles for interconnecting to a microfluidic device 102 or component, at least one septum to facilitate fluidic connections, and/or one or more raised reservoirs. In accordance with some embodiments, the rigid support layers can be thicker than the resilient layers. In some embodiments, the support layers provide structural support for the cartridge assembly and enable it to be securely clamped or bolted in place. The resilient layers can be substantially thinner to allow for flexing, in desired areas, such as where the peristaltic pump head engages the partial channels 122 in the opposite surface of a resilient layer. The thickness of the resilient layers can be selected to enable the peristaltic pump head to effectively deform the partial channels 122 and cause fluid to flow. In some embodiments, the support layers can range in thickness from 0.5 mm to 10 mm or more. In some embodiments, the resilient layers can range in thickness from 0.01 mm to 10 mm or more.

In some embodiments, one or more resilient layers can be provided that are smaller than the adjoining support layer and is bonded to or compressed against only a portion of the surface of the adjoining support layer. For example, in accordance with some embodiments, only the portions of the cartridge assembly that interface with a peristaltic pump head can include a resilient layer. In some embodiments, the adjoining surface of the support layer can be raised or recessed relative to other portions of the surface of the adjoining support layer, obviating the need for the resilient layer to extend over the entire surface of the support layer. In accordance with some embodiments, the resilient layer can extend along at least a portion of a recess in one or more support layers and not extend over the full extent of one or more support layers.

In some embodiments, one or more of the support layers can be provided that are smaller than the adjoining resilient layer and is bonded to or compressed against only a portion of the surface of the adjoining resilient layer. For example, in accordance with some embodiments, only the portions of the cartridge assembly that interface with the peristaltic pump head can include a rigid support layer that bears against the peristaltic pump head where the force is applied to enable the peristaltic pump head to compress portions of one or more partial channels 122 to facilitate pumping.

In accordance with some embodiments, at least one layer is a support layer fabricated from a substantially rigid material to facilitate mounting and/or clamping the cartridge assembly 200 in place on a holder. In some embodiments, the structural integrity of the cartridge assembly 200 can occur by bonding the two relatively resilient layers to form a more rigid device. In some embodiments, the cartridge assembly 200 can include one or more reinforcing elements (e.g., metal, plastic or fiberglass) incorporated into one or more of the layers or bonded between the layers. In some embodiments, at least one support layer can include a PCB.

In some embodiments additional resilient layers and/or support layers can be bonded or secured to the cartridge assembly to provide additional features and functionality. Each additional layer provides the opportunity for an additional set of partial channels 122 and other microfluidic device 102*s* to be integrated into the cartridge assembly. For example, as shown in FIG. 8, a double sided cartridge assembly 300 can include support layer 310, resilient layers 320 and 330 contained between support layer 310 and support layer 340 on one side of the cartridge assembly 300 and resilient layers 350 and 360 contained between support layer 310 and support layer 370 on one side of the cartridge assembly 300. In accordance with this embodiment, two separate microfluidic device 102*s* 302 and 302A can be supported. In addition, strategically placed via holes through support layer 310 and resilient layers 320 and 350 can provide one or more interconnect partial channels 122 that can enable fluid flow between microfluidic device 102*s* 302 and 302A.

In some embodiments, the functional element can include integrated circuit based devices that can be mounted on a PCB or separately mounted on a supporting element that can be incorporated in the microfluidic cartridge assembly.

In with some embodiments, the functional element can include (or be replaced with) a material that becomes dissolved or leaches into the fluid. The material can include a marker or die that can be used for diagnostic functions.

In some embodiments, the material dissolution can used to indicate the end of the useful life of the cartridge assembly. For example, a predefined thickness of material can be applied over the functional element and after a predefined volume of fluid has traversed the cartridge assembly dissolving the material at a known rate, the underlying metal contacts become exposed to the fluid and close or open an electric circuit indicating to an external control system that it is time to replace the cartridge assembly.

In some embodiments, the microfluidic device 102 (e.g., an organ-chip device) can be integrated into the cartridge assembly, for example, by positioning the microfluidic device 102 between the two outer rigid layers or bonding or fastening the microfluidic device 102 to the rigid layer (e.g., in single rigid layer systems). The integrated microfluidic device 102 can be directly connected by partial channels 122 and via holes. In some embodiments, one or more microfluidic device 102*s* can be directly included into the cartridge assembly. For example, the functionalized partial channels 122 of the microfluidic device 102 (e.g., organ-chip) can be defined in the layers of the cartridge assembly in order to attain the intended behavior of the microfluidic device 102. In accordance with some embodiments, microfluidic device 102 and the cartridge assembly can be formed from one monolithic component or a plurality of monolithic layers that make up a cartridge assembly having one or more integrated microfluidic device 102*s*. In accordance with some embodiments, the layers can be built up to provide the microfluidic functionality. In some embodiments, the individual layers can separately fabricated, for example, by casting, molding, machining, laminating or etching and then bonded or fastened together. In accordance with some embodiments, the microfluidic device 102 can be formed as a separate component that can be molded or cast into one or more layers of the cartridge assembly or over-molded into one or more layers of the cartridge assembly.

Further, while the description above refers to the invention, the description may include more than one invention.

While the present invention is susceptible of embodiment in many different forms, there is shown in the drawings and will herein be described in detail preferred embodiments with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.” Additionally, the singular terms “a,” “an,” and “the” include plural referents unless context clearly indicates otherwise.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention. It is also contemplated that additional embodiments according to aspects of the present invention may combine any number of features from any of the embodiments described herein.

What is claimed is:

1. A method of incorporating sensors into a cartridge, comprising:

a. providing a cartridge, said cartridge comprising
 i. a first support layer;
 ii. a first resilient layer, iii. a second resilient layer comprising gasketing embossments that project to form one or more partial channels; and iv. a second support layer comprising a sensor mechanism;

b. forming one or more channels by contacting said one or more partial channels with said sensor mechanism.

2. The method of claim 1, wherein said one or more channels are microfluidic channels.

3. The method of claim 1, wherein each of said one or more channels are further defined by a first via hole and a second via hole.

4. The method of claim 3, further comprising flowing a working fluid within the channel from the first via hole to the second via hole, as to form a flow path.

5. The method of claim 1, wherein said gasketing embossment creates a fluidic seal for said channel.

6. The method of claim 1, wherein said cartridge further comprises an interconnect adaptor.

7. The method of claim 4, further comprising the step of detecting properties of said working fluid with said sensor mechanism.

8. The method of claim 7, wherein the properties of said working fluid are chosen from the group consisting of conductivity, transmission, fluorescence, conductivity, composition, and pressure.

9. The method of claim 4, wherein said sensor mechanism includes one or more metal plates that come into contact with said flow path.

10. The method of claim 4, wherein said sensor mechanism includes electrodes that come into contact with said flow path.

11. The method of claim 10, wherein said electrodes are wired to one or more electronic sensing devices.

12. The method of claim 4, wherein said sensor mechanism applies electric currents or voltage to said working fluid within said fluid path.

13. The method of claim 4, wherein said sensor mechanism measures electric currents or voltage of said working fluid within said fluid path.

14. The method of claim 4, wherein said sensor mechanism measures biological properties of said fluid within said fluid path.

15. The method of claim 9, wherein said metal plates are coated with a biologically inert material.

16. The method of claim 15, wherein said biologically inert material is gold.

17. The method of claim 1, wherein said gasketing embossments are formed from a material that is less rigid than that of the sensor mechanism.

18. The method of claim 1, wherein said gasketing embossments are formed from a material that is more rigid than that of the sensor mechanism.

19. The method of claim 1, wherein said gasketing embossments are formed from molding, machining, hot embossing, or microthermoforming.

20. The method of claim 4, further comprising the step of connecting one or more microfluidic devices into said flow path.

21. A method of incorporating sensors into a cartridge, comprising:

a. providing a cartridge, said cartridge comprising i. a resilient layer comprising gasketing embossments that project to form one or more partial channels, and ii. a support layer comprising a sensor mechanism;

b. forming one or more channels by contacting said one or more partial channels with said sensor mechanism; and c. flowing a fluid into a channel so as to create a flow path, wherein said sensor mechanism includes electrodes that come into contact with said flow path.

22. The method of claim 21, wherein said one or more channels are microfluidic channels.

23. The method of claim 21, wherein each of said one or more channels are further defined by a first via hole and a second via hole.

24. The method of claim 21, wherein said flowing of step c) comprises introducing fluid within the channel from the first via hole to the second via hole, as to form a flow path.

* * * * *